US012795785B2

(12) United States Patent
Haimer

(10) Patent No.: US 12,795,785 B2
(45) Date of Patent: Nov. 10, 2026

(54) DEVICE FOR HEAT TREATMENT AND METHOD FOR OPERATING THE DEVICE

(71) Applicant: Franz Haimer Maschinenbau KG, Hollenbach-Igenhausen (DE)

(72) Inventor: Franz Haimer, Hollenbach-Igenhausen (DE)

(73) Assignee: Franz Haimer Maschinenbau KG, Hollenbach-Igenhausen (DE)

( * ) Notice: Subject to any disclaimer, the term of this patent is extended or adjusted under 35 U.S.C. 154(b) by 657 days.

(21) Appl. No.: 18/461,664

(22) Filed: Sep. 6, 2023

(65) Prior Publication Data

US 2024/0080946 A1 Mar. 7, 2024

(30) Foreign Application Priority Data

Sep. 6, 2022 (DE) ..................... 10 2022 122 629.8

(51) Int. Cl.
*H05B 6/06* (2006.01)
*B23B 31/117* (2006.01)
(Continued)

(52) U.S. Cl.
CPC ............ *H05B 6/06* (2013.01); *B23B 31/1179* (2013.01); *G01B 11/08* (2013.01); *G01K 13/00* (2013.01); *H05B 6/14* (2013.01); *H05B 6/36* (2013.01)

(58) Field of Classification Search
CPC .... H05B 6/06; H05B 6/14; H05B 6/36; B23B 31/1179; G01B 11/08; G01K 13/00
See application file for complete search history.

(56) References Cited

U.S. PATENT DOCUMENTS 6,991,411 B2 * 1/2006 Irion .................. B23B 31/1179 409/234
8,102,682 B2 * 1/2012 Haimer .................... H05B 6/14 363/36
(Continued)

FOREIGN PATENT DOCUMENTS

DE 19915412 A1 10/2000
DE 102005042615 A1 3/2007
(Continued)

OTHER PUBLICATIONS

DE102021132211 English (Year: 2021).*

*Primary Examiner* — Topaz L. Elliott
*Assistant Examiner* — Solan Oliva
(74) *Attorney, Agent, or Firm* — Laurence A. Greenberg; Werner H. Stemer; Ralph E. Locher

(57) ABSTRACT

A device for heat-treating shrink chucks for shank tools includes a receiving device for a shrink chuck, a heat treatment unit, and a measuring/computing unit for temperature measurement. The measuring/computing unit has a temperature sensor measuring a shell temperature of a shrink chuck in the receiving device, and a reflection sensor. The measuring unit applies a current test pulse before heat treatment on the shrink chuck in the heat treatment unit. A time/current curve ascertained for the test pulse is taken as a magnetic fingerprint for the shrink chuck in the heat treatment unit. An item of geometrical information for the shrink chuck is ascertained using the magnetic fingerprint. A reflection measurement is performed on the shrink chuck in the heat treatment unit. A temperature measurement on the shrink chuck performed by the temperature sensor in the heat treatment unit is corrected by the reflection measurement.

23 Claims, 16 Drawing Sheets

(51) Int. Cl.

| | |
|---|---|
| ***G01B 11/08*** | (2006.01) |
| ***G01K 13/00*** | (2021.01) |
| ***H05B 6/14*** | (2006.01) |
| ***H05B 6/36*** | (2006.01) |

(56) References Cited

U.S. PATENT DOCUMENTS

| | | | | |
|---|---|---|---|---|
| 11,166,345 | B2 * | 11/2021 | Podhrázký | B23P 11/027 |
| 2020/0367324 | A1 * | 11/2020 | Podhrazky | H05B 6/10 |
| 2021/0197291 | A1 * | 7/2021 | Diebold | B23P 11/027 |

FOREIGN PATENT DOCUMENTS

| | | | | |
|---|---|---|---|---|
| DE | 102012216186 | A1 | 3/2014 | |
| DE | 102018121883 | A1 * | 3/2020 | H05B 3/40 |
| DE | 102021132211 | A1 * | 9/2022 | H05B 6/14 |
| EP | 3557945 | B1 | 7/2020 | |

* cited by examiner

A-A

DEVICE FOR HEAT TREATMENT AND METHOD FOR OPERATING THE DEVICE

CROSS-REFERENCE TO RELATED APPLICATION

This application claims the priority, under 35 U.S.C. § 119, of German Patent Application DE 10 2022 122 629.8, filed Sep. 6, 2022; the prior application is herewith incorporated by reference in its entirety.

FIELD AND BACKGROUND OF THE INVENTION

The invention relates to a device for heat-treating, in particular inductively heating or cooling, shrink chucks for shank tools, in particular a shrink fit device or a cooling device or a shrink fit device with cooling device (for shrink chucks). The invention furthermore relates to a method for operating such a device.

Such a device for heat-treating shrink chucks, in this case a shrink fit device, is known from German Patent Application DE 10 2012 216 186 A1. The shrink fit device provides a sensor-type temperature measuring device, in this case a radiation/IR thermometer, which contactlessly detects a shell temperature or surface temperature of a shrink chuck and which is positioned fixedly, with a spacing, on the shrink fit device. For the temperature measurement, it is however necessary for an induction coil arrangement of the shrink fit device to be moved out of a range in which it engages with the shrink chuck, such that the shrink chuck surface can be sensed by the sensor. A temperature measurement during a heating operation is therefore not possible.

It has been sought to achieve an improvement in this regard by way of a further such shrink fit device, known from German Patent Application DE 10 2018 121 883 A1, corresponding to U.S. Publication No. 2021/0197291, which has an induction coil arrangement and a sensor-type temperature measuring device that performs contactless detection. In the case of the shrink fit device, a measuring channel extends through the induction coil arrangement, which measuring channel opens into a receiving opening for receiving a shrink chuck. The shrink fit device then furthermore provides for the sensor-type temperature measuring device, which performs contactless detection, to have a temperature sensor, in this case likewise a radiation thermometer, for detecting the shell temperature of the shrink chuck, which temperature sensor engages into the measuring channel.

The radiation thermometer that is used here in the cited prior art (for performing contactless temperature measurement on the shrink chucks) operate on the basis of infrared radiation/thermal radiation emitted by the body (such as the infrared radiation/thermal radiation emitted here by a shrink chuck).

Any body or any object emits a quantity of infrared radiation or thermal radiation corresponding to its surface temperature (which infrared radiation or thermal radiation is detected and evaluated using a radiation thermometer). The intensity of the infrared radiation/thermal radiation changes depending on the object temperature.

Furthermore, however, the intensity of the infrared radiation/thermal radiation of "real bodies" is also dependent on the material and surface. That is to say, (real) bodies radiate with an intensity lower, by a factor that is dependent on material/surface, than that of ideal thermal radiators, that is to say ideal "black body radiators". This factor is known as "emissivity ε".

For contactless temperature measurement, it is therefore necessary, if it is sought to exactly measure the temperatures of individual bodies, to know the (individual) emissivity ε, that is to say the thermal radiation capability, of each body.

Precisely this has proven to be disadvantageous in the case of known shrink fit devices with radiation thermometers used therein, where it is sought to measure the temperature on (numerous different) real bodies, that is to say the shrink chucks, which have emissivities c which in practice are unknown.

Normally, therefore, the radiation thermometer used is preset (or calibrated) for a particular emissivity ε. That is to say, exact temperature measurement is possible only for a very specific body with a very specific material/surface (specifically for those bodies whose material/surface has exactly the preset emissivity ε), which leads to measurement errors for all other bodies (or shrink chucks) to be measured, which have different emissivities ε.

It is furthermore known from European Patent EP 3 557 945 B1, corresponding to U.S. Pat. No. 11,166,345, (shrink fit device with heating control) to apply a current (test pulse) of known current magnitude, current form, frequency and effective period to an induction coil of an inductive shrink fit device before the start of an actual inductive heating operation on the shrink chuck that has been inserted into the induction coil; for this test pulse, to ascertain a time/current curve for the shrink chuck that has been inserted into the induction coil; and to take the overall time/current curve ascertained for the test pulse as the magnetic fingerprint for the shrink chuck that has been inserted into the induction coil.

European Patent EP 3 557 945 B1, corresponding to U.S. Pat. No. 11,166,345, furthermore also describes that, and how, the magnetic fingerprint, or the time/current curve, ascertained for a shrink chuck that has been inserted into the induction coil can be used to automatically determine what shrink chuck has been inserted into the induction coil (in order to be heated), in particular a geometry of a shrink chuck that has been inserted into the induction coil.

European Patent EP 3 557 945 B1, corresponding to U.S. Pat. No. 11,166,345, also presents circuits that can generate this test pulse in an induction coil.

The entire content of European Patent EP 3 557 945 B1, corresponding to U.S. Pat. No. 11,166,345, (shrink fit device with heating control) is hereby incorporated into the subject matter of this application.

SUMMARY OF THE INVENTION

It is accordingly an object of the invention to provide a device for heat treatment and a method for operating the device, which overcome the hereinafore-mentioned disadvantages of the heretofore-known devices and methods of this general type and which improve the shrink fit devices known in the prior art, and known devices for heat-treating shrink chucks in general, with regard to their temperature measurement on the shrink chucks to be treated, and (thus) to ensure reliable heat treatment, in particular heating or cooling, of shrink chucks, with a high level of safety and easy handling.

This object is achieved by a device for heat-treating, in particular inductively heating or cooling, shrink chucks, and a method for operating such a device, having the features of the respective independent claims.

Dependent claims and the following description relate to advantageous refinements of the invention, which relate both to the device and to the method.

Unless explicitly defined otherwise, terms such as up, down, front, rear, left or right that may be used are to be understood in the usual way, and in the light of the present figures. Where used and unless explicitly defined otherwise, terms such as radial and axial are to be understood in relation to central axes or axes of symmetry of parts/components described here, and in the light of the present figures.

Where used, the term "substantially" may be understood (in accordance with the understanding adopted at the highest judicial level) to mean "to a practically still considerable degree". Possible deviations from an exact value that are implied by this term may thus arise unintentionally (that is to say without any functional basis) due to manufacturing or assembly tolerances or the like.

With the foregoing and other objects in view there is provided, in accordance with the invention, a device for heat-treating, in particular for inductively heating or cooling, shrink chucks for shank tools, in particular a shrink fit device or a cooling device or a shrink fit device with cooling device (for shrink chucks), has a receiving device forming a receiving region for a shrink chuck, in particular has a receiving opening, for receiving the shrink chuck, has a heat treatment unit which encloses the receiving device or the receiving region in particular concentrically with respect to a central axis, in particular an induction coil arrangement or a cooling unit, and has a measuring/computing unit for in particular contactless temperature measurement of the shrink chuck.

Here, a "... unit," such as the measuring/computing unit, may in particular also have a processor, a memory unit, an interface and/or an operating, control and calculation program, which is stored in particular in the memory unit and also serves in particular for execution, for controlling measuring sensors and for evaluating measurements.

Furthermore, in the case of the device according to the invention, provision is made for the measuring/computing unit to have at least one temperature sensor, for in particular contactlessly detecting a shell temperature of a shrink chuck that is disposed in the receiving device, and a reflection sensor, in particular an infrared reflection sensor, which are disposed around the receiving device or receiving opening.

Such a reflection sensor has proven in this regard to be particularly expedient, because such a reflection sensor can inter alia also be used to ascertain a surface condition of an object (for example matte, bright, . . . or emissivity ε) and also the presence of an object per se, in particular, as is the case here, of the shrink chuck that has been inserted into the heat treatment unit, in particular induction coil arrangement.

The measuring/computing unit is furthermore configured:

such that a current (test pulse) of known current magnitude, current form, frequency and effective period can be or is applied to the heat treatment unit, in particular the induction coil arrangement, before the start of an actual heat treatment operation, in particular the cooling operation or the inductive heating operation, on the shrink chuck that has been inserted into the heat treatment unit, in particular induction coil arrangement, such that, for this test pulse, a time/current curve for the shrink chuck that has been inserted into the heat treatment unit, in particular induction coil arrangement, can be or is ascertained, and the overall time/current curve ascertained for the test pulse can be or is taken as a magnetic fingerprint for the shrink chuck that has been inserted into the heat treatment unit, in particular induction coil arrangement, such that, using the magnetic fingerprint, an item of geometrical information, in particular an outer diameter, for the shrink chuck that has been inserted into the heat treatment unit, in particular induction coil arrangement, can be or is ascertained, such that a reflection measurement can be or is performed, by the reflection sensor, on the shrink chuck that has been inserted into the heat treatment unit, in particular induction coil arrangement, and in particular, a reflection measurement can be or is performed, by the reflection sensor, on the shrink chuck that has been inserted into the heat treatment unit, in particular induction coil arrangement, and can be or is corrected using the item of geometrical information (corrective value 1), and such that, using the reflection measurement and the item of geometrical information or using the corrected reflection measurement (corrective value 2), a temperature measurement can be or is performed, by the temperature sensor, on the shrink chuck that has been inserted into the heat treatment unit, in particular induction coil arrangement, and can be or is corrected.

The shell temperature or a resulting shell temperature of the shrink chuck that has been inserted into the heat treatment unit, in particular induction coil arrangement, can then be ascertained from the corrected temperature measurement, or the measuring/computing unit may furthermore be configured such that the shell temperature or a resulting shell temperature of the shrink chuck that has been inserted into the heat treatment unit, in particular induction coil arrangement, can be or is then ascertained from the corrected temperature measurement.

In the method for operating a device according to the invention, in particular a shrink fit device according to the invention, a current (test pulse) of known current magnitude, current form, frequency and effective period is applied to the heat treatment unit, in particular the induction coil arrangement, before the start of an actual heat treatment operation, in particular the cooling operation or the inductive heating operation, on the shrink chuck that has been inserted into the heat treatment unit, in particular induction coil arrangement, for this test pulse, a time/current curve for the shrink chuck that has been inserted into the heat treatment unit, in particular induction coil arrangement, is ascertained, and the overall time/current curve ascertained for the test pulse is taken as the magnetic fingerprint for the shrink chuck that has been inserted into the heat treatment unit, in particular induction coil arrangement, using the magnetic fingerprint, an item of geometrical information, in particular an outer diameter, for the shrink chuck that has been inserted into the heat treatment unit, in particular induction coil arrangement, is ascertained, a reflection measurement is performed, by the reflection sensor, on the shrink chuck (4) that has been inserted into the heat treatment unit, in particular induction coil arrangement, and in particular, using the item of geometrical information (corrective value 1), a reflection measurement is performed, by the reflection sensor, on the shrink chuck that has been inserted into the heat treatment unit, in particular induction coil arrangement, and corrected, and, using the reflection measurement and the item of geometrical information or using the corrected reflection measurement (corrective value 2), a temperature measurement is performed, by the temperature sensor, on the shrink chuck that has been inserted into the heat treatment unit, in particular induction coil arrangement, and corrected.

In simplified and illustrative terms, in one case, the reflection sensor corrected using the item of geometrical information corrects the temperature sensor, and in the other case, the temperature sensor is corrected using the "pure"/non-corrected reflection sensor signal and the item of geometrical information.

Here, "corrected" can be understood to mean that what is to be corrected is ascertained taking into consideration or using something that has been (pre-)ascertained.

Here, by way of example and in simplified or illustrative terms, it is thus possible for an item of geometrical information, in particular an outer diameter of the shrink chuck, to be taken into consideration in the reflection measurement or when ascertaining the reflection or in the temperature measurement or when ascertaining the temperature.

In other words, the item of geometrical information is taken into consideration in the reflection measurement or when ascertaining the reflection or in the temperature measurement or when ascertaining the temperature, or in other words again, the result of the reflection measurement or the result of the temperature measurement is dependent on the item of geometrical information.

It is correspondingly then possible here—by way of example and in simplified or illustrative terms—for the corrected reflection measurement or the result of the corrected reflection measurement to be taken into consideration in the temperature measurement or when ascertaining the temperature or shell temperature, or for the non-corrected reflection measurement together with the item of geometrical information, in particular an outer diameter of the shrink chuck, to be taken into consideration in the temperature measurement or when ascertaining the temperature or the shell temperature.

In other words, the corrected reflection measurement or the result of the corrected reflection measurement is taken into consideration in the temperature measurement or when ascertaining the (shell) temperature, or the non-corrected reflection measurement and the item of geometrical information are taken into consideration (therefore directly and not by way of the corrected reflection measurement) in the temperature measurement or when ascertaining the (shell) temperature.

"Taking into consideration" may also mean the incorporation of "corrective terms," "corrective factors" and/or "corrective values" that correspond to mathematical rules or algorithms that are to be applied in this regard.

This may for example also be implemented by virtue of calibration/setting or (pre-)setting being performed on the at least one temperature sensor using the reflection measurement by the reflection sensor, or by virtue of the measurement by the reflection sensor being used to determine how the resulting shell temperature is determined, in particular from the measurements by the temperature sensor.

The item of geometrical information may for example be an outer diameter of the shrink chuck that has been inserted into the heat treatment unit, in particular induction coil arrangement, or other geometrical data that describe the shrink chuck that has been inserted into the heat treatment unit, in particular induction coil arrangement, such as material or wall thicknesses, lengths and the like, or else merely material parameters.

Such a preferably contactlessly measuring temperature sensor may for example be a sensor that is based on the measurement of (thermal) radiation from bodies. This may for example be a radiation sensor, for example a pyrometer or ratio pyrometer.

Such a reflection sensor may for example be an infrared reflection sensor.

In particular, it may be expedient to use multiple temperature sensors, disposed around the receiving device or the receiving region, or at least one temperature sensor, disposed around the receiving device or receiving region and in particular inclined with respect to the central axis, for in particular contactlessly detecting a shell temperature or surface temperature of a shrink chuck that is disposed in the receiving device/in the receiving region. Here, provision may expediently furthermore be made for such a temperature sensor to be a radiation detector or a radiation sensor.

In other words, it is very particularly expedient if each of the multiple temperature sensors and/or the inclined temperature sensor are or is configured as a radiation detector, in particular as a pyrometer with a radiation detector, for detecting thermal radiation from a shrink chuck that is disposed in the receiving device.

An angle of inclination of the inclined temperature sensor is preferably between 30° and 60°, in particular is 45°.

By virtue of the sensor being inclined, it is possible, in particular in a region in which it is sought to perform measurement and/or monitor the surface temperature, for example in the range from 50° C.-70° C., to better detect the surface by way of an emissivity $\varepsilon$.

Furthermore, by virtue of the temperature sensor being inclined, it is possible to realize a larger detectable region that can be monitored by the temperature sensor.

In particular, it may also be expedient if at least the, or one of the, multiple temperature sensors and/or the inclined temperature sensor provides a focusing apparatus and/or a shielding device, in particular a diaphragm.

In this way, or by using such a focusing device and/or shielding device, it can be achieved that the temperature sensor is insensitive (less sensitive) to stray radiation, for example from a device, for example a shrink fit device, which is disposed close to the temperature sensor and is emitting thermal radiation. Additional shielding device for the temperature sensor can thus be omitted where appropriate.

Provision may then furthermore be made here whereby, if at least two, in particular multiple, temperature sensors are used in the device, the temperature sensors are used jointly to measure the shell temperature or surface temperature of a shrink chuck that is disposed in the receiving device/in the receiving region.

"Used" may mean in particular that a resulting shell temperature or surface temperature is ascertained using the at least two, in particular multiple, temperature sensors, or the measurements/measured values thereof.

A first, simplest approach, in this regard for multiple temperature sensors, could be to determine an average value from the temperature sensors, or from their measurements/measured values, as a resulting shell temperature. Here, the individual temperature sensors, or their measurements/measured values, may also each individually be weighted.

Provision may thus furthermore be made here, in the case of multiple temperature sensors, for at least two, in particular several or all, of the temperature sensors to have different configurations/measurement settings.

"Different configurations/measurement settings" (in the case of the temperature sensors) may be understood in particular to mean that the temperature sensors are differently calibrated, for example for/to different materials/surfaces of shrink chucks (or different emissivities ε). This may also mean that the temperature sensors have measurement ranges in different wavelength ranges (cf. ratio pyrometer).

In other words, provision may be made whereby, for multiple temperature sensors, different calibrations/settings, in particular different emissivities ε, are set, and measurements by the multiple temperature sensors are compared and/or jointly processed, and from these the resulting shell temperature is determined.

There may however in particular also be the mathematical advantage here that, if the measurements by the multiple temperature sensors are set in relation to one another, the emissivity ε can be eliminated.

As an alternative to this, provision may also be made for the signal of one temperature or radiation sensor that is used to be evaluated in different ways, for example on the basis of different emissivities ε, rather than using multiple temperature sensors with different configurations/measurement settings.

The temperature measurement is improved in particular if the sensors are disposed around the receiving device/around the receiving region or opening.

In one refinement, provision may also be made for the sensors to be disposed in a circle (if appropriate in groups in different circles) with respect to the central axis and/or at different axial heights with respect to the central axis, at or around the receiving device/receiving region. This may be implemented with a uniform pitch or else with a non-uniform pitch.

Provision may also be made here for each sensor to be individually fastened at its predetermined position, for example in or on the heat treatment unit or on a housing thereof, or for a common holding apparatus, for example an annular structural unit (measuring ring) that at least partially encloses the receiving device/the receiving region, to be provided, which holding apparatus or structural unit receives the sensors and is then in turn installed in the device or in or on the heat treatment unit/housing.

Here, the substantially annular structural unit or the measuring ring may preferably be disposed coaxially with respect to the central axis in the device, in particular axially adjacent to the heat treatment unit, in particular the induction coil arrangement or the cooling unit.

It may also be expedient for sensors of the same type to be disposed adjacently, for example "bundled" in (circular) segments, in the substantially annular structural unit. For example, the temperature sensors may be disposed adjacent to one another in one circular segment of the substantially annular structural unit or of the measuring ring.

In one refinement, provision may also be made for the heat treatment unit and/or a housing of the heat treatment unit to have, or to have extending through it, at least one or more recesses, for example (measuring) channels which open into the receiving region formed by the receiving unit and which are in particular radial, in or at which recesses or channels a or in each case one of the sensors is disposed.

In the case of an induction coil arrangement as a heat treatment unit, it may be expedient in particular if a coil winding of the induction coil arrangement is wound around the channels so as to leave the relevant recess or the relevant channel free.

A sensor, such as the temperature sensor and/or the reflection sensor, may then be disposed or inserted in such a (measuring) channel or at least partially in such a measuring channel and/or at such a (measuring) channel, specifically such that the sensor performs measurement through the measuring channel.

If the sensor is furthermore also disposed outside a housing of the heat treatment unit, then it is expedient if the housing provides a corresponding aperture for the sensor (through which the sensor can perform measurement).

In particular, it is expedient from a measurement aspect if such a measuring channel runs substantially radially with respect to the central axis through the heat treatment unit and/or the housing thereof.

In one refinement, provision may also be made for such a measuring channel to be disposed in an axial central region of the induction coil arrangement, preferably approximately in the middle between the axial ends thereof.

It has furthermore proven to be expedient for a preferably exchangeable protective window, which is in particular permeable to thermal radiation, to be inserted into such a measuring channel, in particular in order to protect the sensor against contamination and/or damage.

In this regard, provision may also be made, alternatively or in addition to the enwound (measuring) channels, whereby, in the case of an induction coil arrangement as a heat treatment unit, the induction coil arrangement has two or more mutually spaced partial coils, wherein a or the sensors are then disposed in the spacings between the partial coils in accordance with the channel arrangement (and can perform measurement through same). This may correspondingly also be provided in the case of a cooling unit, with partial units, as a heat treatment unit.

Furthermore, measured values may be transmitted from the temperature sensor and/or reflection sensor to the measuring/computing unit by wire or wirelessly.

It is also expedient if the device is configured with a control unit. The control unit may serve in particular for controlling the heat treatment unit, such as the induction coil arrangement or the cooling unit, for example such that the control unit controls a power of the heat treatment unit, for example a supply of current to the induction coil arrangement, based on the shell temperature ascertained using the sensors.

Provision may furthermore also be made for the ascertained shell temperature to be used (simply only) for detecting a temperature state of the shrink chuck. That is to say, in simple and illustrative terms, that the ascertained shell temperature can be used to identify whether a shrink chuck that has already been heated is situated in the device, and if so, what the shell temperature thereof is.

In such a case, the controller may for example not start a heating operation (in the first place) if the shrink chuck is already (excessively) hot.

It may furthermore also be expedient for the device to have a display device for displaying a thermal state, in particular of a tool receptacle that is disposed in the receiving device/in the receiving region, in particular of a shrink chuck. The display device may for example be colored diodes. Different colors may indicate different thermal states.

Preferably, the operation of a shrink fit device according to the invention may include a shrink chuck being inductively heated, and thus expanded, in the receiving device enclosed by a heat treatment device configured as an induction coil arrangement, and, using the resulting shell temperature, the heating operation being controlled, and in particular the heating operation being automatically stopped when a specified temperature is reached.

It may alternatively include a shrink chuck being cooled in the receiving device enclosed by a heat treatment device configured as a cooling unit, and, using the resulting shell temperature, the cooling operation being controlled.

The control may for example involve a supply of current to the heat treatment unit being varied or adapted and/or controlled based on the resulting shell temperature.

Proceeding from the problem of different and unknown emissivities c in the case of multiple shrink chucks whose temperatures are to be measured, the invention is based on the consideration that, if a (radiation) sensor is used for the temperature measurement, it would be or is necessary to know the specific emissivity ε of the relevant (individual) shrink chuck (for exact temperature measurement/determination), and thus the (radiation) sensor would in each case have to be individually set for the emissivity ε (if appropriate computationally), and the (radiation) sensor would have to be individually calibrated for the respective shrink chuck.

To remedy this, the invention provides a reflection sensor or for a reflection measurement to be performed on a shrink chuck which is disposed in the receiving device and which is to be measured, which reflection sensor is (or can be) used to ascertain information specific to the shrink chuck that is disposed in the receiving device, such as the individual emissivity ε, using which the (corrected) temperature measurement is then performed.

Since it has however also been identified that the reflection measurement is also influenced by a spacing between the reflection sensor and the shrink chuck or shrink chuck surface/shell, which spacing is in turn also dependent on a geometry of the shrink chuck that is disposed in the receiving device, in particular on the outer diameter thereof, the invention provides an approach for automatically obtaining the items of geometrical information in this regard, in particular the outer diameter of the shrink chuck that is disposed in the receiving device.

According to the invention, this is done using the (individual) magnetic fingerprint or by ascertaining the (individual) magnetic fingerprint for an (individual) shrink chuck that is disposed in the receiving device, which magnetic fingerprint is then used, or can then be used, to ascertain or retrieve items of geometrical information that are specific to the shrink chuck that is disposed in the receiving device, such as the individual outer diameter.

Using this item of geometrical information, the reflection measurement can then be performed and corrected (reflection measurement corrected using corrective value 1), and the temperature measurement can furthermore then be performed and corrected using the corrected reflection measurement (temperature measurement corrected using corrective value 2).

It is alternatively also possible for the item of geometrical information to be taken into consideration directly, but then together with a non-corrected reflection measurement, in the temperature measurement, and for the temperature measurement to be performed thus.

With the invention, this means in particular that additional distance sensors that may be necessary, for the spacing between the reflection sensor and shrink chuck or shrink chuck surface/shell, are superfluous.

It has proven to be a further particular advantage of the invention that it can be automated, because the entire invention is capable of being carried out automatically by corresponding control programs for the sensors, measurements and calculations.

Subject matter or content of European Patent EP 3 557 945 B1, corresponding to U.S. Pat. No. 11,166,345, which is furthermore also incorporated into the subject matter of the present application:

The invention relates to a shrink fit apparatus or a device for heat-treating, in particular for inductively heating or cooling, shrink chucks for shank tools, in particular a shrink fit device or a cooling device or a shrink fit device with cooling device, including a receiving device, in particular a receiving opening, for receiving a shrink chuck, having a heat treatment unit which encloses the receiving device in particular concentrically with respect to a central axis, in particular an induction coil arrangement or a cooling unit, and a measuring/computing unit for in particular contactless temperature measurement of the shrink chuck.

PRIOR ART

Shrink fit apparatuses for the shrink-fitting and removal of tool shanks into and from tool holders have been known for some time. Originally, such shrink fit apparatuses were operated using a gas burner or hot air, which was used to heat the sleeve section of the tool holder in order to expand it to such an extent that it can receive a tool shank with an interference fit, or releases the tool shank. More recently, use has increasingly been made of shrink fit apparatuses in which the relevant tool holder is heated using an induction coil. This has greatly accelerated the shrink-fitting process and made it more efficient and easier to manage, thus contributing to its more widespread use.

The first shrink fit apparatus suitable for practical use is described in the patent literature by German Patent Application DE 199 15 412, corresponding to U.S. Pat. Nos. 6,712,367 and 6,991,411.

Currently known shrink fit apparatuses have not yet been optimally automated. Errors can occur, such as inductive heating of the sleeve section of a tool holder for an excessive length of time. This can result in overheating of the sleeve section of the tool holder. The sleeve section is then undesirably tempered, so to speak. This can lead to an adverse change in structure. Under some circumstances, the sleeve section, and thus the tool holder as a whole, must be rejected. If the sleeve section is not immediately rejected, there is at any rate the risk of it becoming cracked if it has been overheated several times.

It has already been sought to remedy this by measuring the temperature of the sleeve section using an infrared detector or using a probe that touches the surface of the sleeve section. Both types of measurement are however prone to errors. Measurement using an infrared detector is highly dependent on the color and condition of the sleeve section. In particular, after a relatively long period of use, sleeve sections may exhibit a certain temper color, which falsifies the temperature measurement. Dirt and any cooling lubricant residues also have an adverse effect.

Contact-type probes also have their problems. This is because the accuracy of the temperature measurement is in this case dependent inter alia on the intensity of contact and likewise on the cleanliness of the surface of the sleeve section in each case.

The German Patent Application DE 10 2005 042 615, corresponding to U.S. Pat. No. 8,102,682, discloses the concept of measuring the current that is supplied from the power inverter to the coil, in order to thus directly infer the power being supplied to the coil at the time of the measurement. It is thus possible to fully utilize the performance of the modules used in the circuit, without the need to accept the risk of overloading the coil.

The Problem on which the Invention is Based

The invention is therefore based on the problem of specifying a shrink fit apparatus or a shrink fit method that is capable of restricting the thermal load on the sleeve selection, and ideally limiting the thermal load to that which is necessary.

The Solution According to the Invention

According to the invention, a method for monitoring the temperature of the sleeve section of a tool holder that has been inserted into the induction coil of a shrink fit device is proposed, the method being distinguished by the following features: The present inductance of the induction coil is measured during the inductive heating and used as a measure of the warming. The supply of current to the induction coil is influenced if the present inductance approaches, reaches or overshoots a specified value. In general, the supply of current is then deactivated.

Using the present inductance as a measure of the present temperature of the sleeve section has the major advantage that the disturbance variables that have hitherto falsified the measurements, such as color, condition and purity of the surface of the sleeve section, are eliminated entirely. In relation to electrical variables that have hitherto been used, such as the measurement or calculation of the electrical energy that has been imparted up to a certain point in time, measuring the present inductance has the advantage that it is much more accurate. The shrink chuck is thus not always heated to the maximum value or over a maximum length of time, but power is induced in a tailored manner, which furthermore protects the shrink chuck and can accelerate the subsequent cooling process, if necessary.

According to the invention, provision is made whereby, for one or more tool holders with different sleeve sections, the present inductance that is reached in the induction coil when the sleeve section that has been inserted into the induction coil has been heated to such an extent that shrink-fitting or removal is possible is measured and stored.

Then, at the start of a new shrink-fitting operation, it is queried what tool holder has been inserted into the induction coil for the purposes of shrink-fitting or removal. In response to this query to the system or to the operator, the user can input this information, or this information is automatically identified by the system. In this way, for this tool holder, it is possible to read out the inductance that is present in the sleeve section/induction coil system when the sleeve section has attained the desired temperature for then starting the inductive heating operation.

According to the invention, the heating cycle is ended when a present inductance is measured which corresponds to the stored inductance that is present in the sleeve section of the tool holder when the sleeve section is ready for shrink-fitting or removal.

Further Structural Possibilities

It is a further object of the invention to specify a shrink fit apparatus which is much more compact than currently known shrink fit apparatuses and which therefore forms a suitable starting point for constructing a shrink fit apparatus for mobile use, ideally such that the shrink fit apparatus is a device which can be transported in the manner of a small suitcase and which can be used in a novel manner by the operator by being quickly brought to the machine tool that is to undergo a tool change, and being used there for performing a tool change in situ at the machine.

This self-evidently does not rule out that the shrink fit apparatus can also be used conventionally in a static position on a corresponding holding apparatus, but mobile use is preferred.

The problem is solved by a shrink fit apparatus for clamping and releasing tools which have a tool shank, as described in connection with the main claim.

The shrink fit apparatus includes a tool receptacle with a sleeve section, which is open at its free end and which is composed of electrically conductive material, for frictionally receiving the tool shank.

The shrink fit apparatus furthermore includes an induction coil, which surrounds the sleeve section of the tool receptacle, for heating the sleeve section, the induction coil being subjected to a preferably high-frequency alternating current (ideally with a frequency of normally greater than 1 kHz) and being configured as an annular or cylindrical coil. Here, the induction coil, at its outer periphery, bears a first shell composed of magnetically conductive and electrically non-conductive material, composed for example of ferrite or a metal powder material. In the context of the invention, an electrically non-conductive material need not imperatively be an insulator. A material is non-conductive if eddy currents induced by magnetic fields cause only little or no heating in the material.

The shrink fit apparatus according to the invention furthermore includes power semiconductor components for generating an alternating current that feeds the induction coil.

So-called IGBTs are typically used here. Use may however also be made of thyristors or MOSFETs. The shrink fit apparatus according to the invention also includes an induction coil housing, which generally is formed of plastics. Such an induction coil housing typically has no or at least no perceptible magnetic shielding action. It serves solely to protect the components situated therein against external influences, and at the same time to prevent the possibility of contact between the operating person and voltage-carrying parts.

The shrink fit apparatus according to the invention is distinguished by the fact that the induction coil and its first shell are surrounded at the outer periphery by a second shell. The second shell is formed of magnetically non-conductive and electrically conductive material. It is configured such that any stray field induces electrical currents therein and thus depletes the energy of the stray field, thereby attenuating same. This means that the second shell entirely eliminates the stray field situated in its surroundings, or at least reduces the stray field such that, preferably without further measures or instead in combination with further accompanying measures, the remainder of the stray field that is still present in the immediate surroundings of the second shell is so weak that it has no adverse effect on power semiconductor components disposed there.

This solution according to the invention is furthermore distinguished by the fact that at least the power semiconductor components are accommodated together with the induction coil in an induction coil housing. The induction coil housing preferably is of insulating material, or is externally coated with such a material.

It peripherally surrounds the following components, or accommodates the following components in its interior: The induction coil, the first and second shells thereof, and at least the power semiconductor components, preferably also the capacitors that are situated directly in the power circuit, and/or the controller.

"Surrounding" is to be understood at a minimum to mean externally enclosing at least along the periphery of the induction coil. In general, the induction coil housing will also extend into the region of the upper and lower end sides, and entirely or partially cover these. It then has a pot-shaped form. The induction coil housing generally has, at least at its periphery, no wall apertures other than for example a local aperture required for functional reasons, for example for the supply line or the like.

Further Structural Possibilities

The shrink fit apparatus is preferably configured such that its power semiconductor components are disposed directly at the outer periphery of the second shell. "Directly at the outer periphery" may mean "disposed a maximum radial distance of for example up to 60 mm, or preferably only up to 15 mm, from the outer peripheral surface of the second shell of the induction coil". In the absence of a second shell, the outer peripheral surface of the first shell is definitive.

The power semiconductor components are however ideally in direct thermally conductive contact, by way of at least one of their surfaces, with the second shell, with the interposition of at most an adhesive layer. The second shell is preferably configured to form a cooling element for the power semiconductor components. The second shell then absorbs the lost heat that arises in the power semiconductor components, dissipating the lost heat from same.

It has proven to be particularly expedient if the second shell has one or preferably multiple cutouts that each receive a power semiconductor component, preferably such that the semiconductor component is enclosed in each case on at least three or preferably four sides by the second shell. Such a cutout in the second shell forms a region that is particularly well-protected against any remaining magnetic stray field. This is because the stray field lines cannot infiltrate into this more deeply recessed cutout in which the power semiconductor component is situated. The stray field lines are instead captured by the surrounding regions, which are higher or situated radially further to the outside, of the second shell.

It has proven to be particularly expedient if the shrink fit apparatus, which includes at least one rectifier and at least one smoothing capacitor and resonant circuit capacitors which are involved, within the apparatus, in generating a high-frequency alternating voltage for feeding the induction coil, has an induction coil, around the outer periphery of which the capacitors are grouped, generally such that the capacitors, if they were theoretically to be rotated about the center of the coil, form a cylindrical ring that encloses the induction coil. In this case, too, the capacitors should be disposed directly at the outer periphery of the second shell of the induction coil.

In this context, the expression "directly at the outer periphery" can be understood to mean a maximum radial distance of up to 125 mm, preferably of up to 40 mm, measured from the outer periphery of the second shell of the induction coil. In the absence of a second shell, the outer peripheral surface of the first shell is definitive.

A particularly expedient embodiment of the shrink fit apparatus, for which protection is claimed not only dependently but also independently in a manner that is not dependent on preceding claims, includes at least an induction coil for the shrink-fitting and removal of tool shanks into and from tool holders, which induction coil is surrounded by a first shell that is formed of magnetically conductive and electrically non-conductive material, wherein the induction coil and its first shell are surrounded by a second shell that is formed of magnetically non-conductive and electrically conductive material.

For the second shell, that which has already been stated above applies. Ideally, in this case, too, the second shell is configured such that eddy currents are generated therein under the influence of a stray field, passing through it, of the induction coil, the eddy currents leading to an elimination of the stray field influence at the outer surface of the second shell. The principle of so-called mutual induction may be utilized here. Eddy currents are generated in the second shell by the stray field passing through it, which eddy currents in turn establish an opposing field that eliminates the disruptive stray field, at least to such an extent that power semiconductor components can be accommodated in the vicinity of the second shell without sustaining permanent damage.

Another particularly expedient embodiment of the shrink fit apparatus, for which protection is claimed not only dependently but also independently in a manner that is not dependent on preceding claims, includes an induction coil for the shrink-fitting and removal of tools into and from tool holders, which induction coil, together with the associated power semiconductor components required to generate the alternating voltage which feeds the induction coil and which has been transformed in relation to the mains voltage, is accommodated in the induction coil housing that surrounds the induction coil.

It is preferable for yet further components, for example capacitors which are situated in the power circuit and/or a rectifier and/or a transformer and/or the electronic controller, to also be accommodated within the induction coil housing. No second shell is provided in this embodiment. This may optionally be substituted by virtue of the power semiconductor components and/or the set of power electronics and/or the rectifiers themselves each having shielded housings or being accommodated in shielded compartments. Here, it is preferable for at least the power semiconductor components to be actively cooled, for example by the coolant supply of the machine tool.

This approach is possible with greater effort, and is therefore included in the subject matter for which protection is sought.

A particularly compact shrink fit apparatus is thus obtained, which is no longer reliant on a separate switchgear cabinet of greater or lesser size which stands adjacent to the shrink fit apparatus and in which these components are separately accommodated. This goes a long way toward achieving the aim of realizing a mobile shrink fit device.

It is preferable for all variants of the shrink fit apparatus according to the invention to be configured such that that end side of the induction coil which faces away from the tool receptacle is equipped with a cover composed of magnetically conductive and electrically non-conductive material. The cover is ideally configured as a pole shoe which extends over the full area of the entire end surface of the induction coil. This is particularly important here in order to keep the exterior space free from a detrimental stray field. In exceptional cases, if the cover does not cover the full area of the entire end surface of the induction coil physically, then it does so magnetically.

It has proven to be particularly expedient if the cover has, locally in the center close to the sleeve section, a shielding collar which projects upward beyond the free end side of the sleeve section of the tool holder in the direction of the longitudinal axis L, preferably by at least twice the magnitude of the tool diameter. Such a shielding collar prevents the tool shank close to the sleeve section from being exposed to a detrimental stray field, or being the starting point for such a stray field, which propagates from there into the surroundings and has a detrimental influence, which is to be avoided, on the power semiconductor components disposed in the immediate vicinity of the induction coil.

It is expedient if that end side of the induction coil which faces toward the tool receptacle is also engaged over by a magnetically conductive and electrically non-conductive material, and preferably completely covered by same with the exception of the receiving opening for the tool holder.

In one particularly preferred embodiment, provision is made for the shrink fit apparatus to have at least one electrical circuit board which is disposed directly at the outer periphery of the induction coil or engages around the outer periphery of the induction coil preferably in the manner of a peripherally predominantly or entirely closed ring and which electrically contacts the capacitors situated in the power circuit and/or the power semiconductor components. A circuit board is to be understood here preferably to mean a panel which has a thickness of for example at least 0.75 mm and which has conductor tracks composed of metallic material applied thereto, though use may alternatively also be made of a film provided with metallic conductor tracks.

It is particularly expedient if the circuit board is a circuit board annular disk, the axis of rotational symmetry of which runs preferably coaxially but otherwise parallel to the longitudinal axis of the induction coil.

Ideally, two circuit board annular disks are provided, between which along the periphery of the induction coil the capacitors situated in the power circuit are disposed.

In one particularly preferred exemplary embodiment, provision is made for the second shell to form one or more cooling channels which preferably run in the interior of the second shell when considering the second shell as a whole. For this purpose, the second shell may be formed of two or more parts. The individual parts of the shell are then sealed with respect to one another. This makes it much easier to produce internally situated cooling channels.

Another particularly expedient embodiment of the shrink fit apparatus, for which protection is claimed not only dependently but also independently in a manner that is not dependent on preceding claims, is a shrink fit apparatus that is distinguished by the fact that the shrink fit apparatus has a coupling for fastening the shrink fit apparatus to the receptacle of a machine tool spindle. This embodiment, too, goes a long way to creating a practically usable mobile shrink fit apparatus. This is because it is dangerous to work with a mobile shrink fit device which is merely exposed in some way in the vicinity of the power tool without somehow being safely secured.

This problem is eliminated with the coupling according to the invention. The coupling makes it possible, after the shrink chuck that is to undergo a tool change has been removed, to fasten the shrink fit device in place of the shrink chuck to the machine spindle. Here, the shrink fit apparatus is securely held for the duration of its operation and can subsequently be quickly decoupled and removed again.

In one variant, the coupling can also be used for storing the shrink fit apparatus in the tool magazine of the machine tool. The shrink fit apparatus can be automatically inserted from the magazine into the machine spindle by the tool changer.

In a further variant, the tool changer may take the shrink fit apparatus out of the tool magazine, not to insert it into the machine spindle, but instead to move the shrink fit apparatus directly to a shrink fit receptacle that is clamped in the machine spindle, and to shrink-fit or remove the tool. For this, too, the dedicated coupling for the shrink fit apparatus is particularly advantageous.

Ideally, the shrink fit apparatus is furthermore configured such that, if it has an internal cooling arrangement, it can be fed with coolant by the cooling system of the machine tool.

It is particularly expedient to construct the shrink fit apparatus such that the induction coil with its first and, if present, with its second shell and at least with the power semiconductor components and/or the capacitors, and/or ideally also the set of electronics for actuating the power semiconductor components, are accommodated in the interior of a coil housing or coil housing ring which encloses at least the periphery of the induction coil and preferably also engages at least partially over one, preferably both end sides of the induction coil. This results in a compact unit in which all components that are required for operation can be accommodated as appropriate and protected against external influences by the common housing and reliably shielded so as to prevent voltage-carrying parts from being touched by the operator.

Ideally, the coil housing is equipped with a plug connector, typically a Schuko plug connector (preferably in the form a plug connector fastened to the end of a flexible supply line), for the direct infeed of single-phase mains alternating voltage from the public grid (preferably 110 V or 230 V).

This enables the shrink fit apparatus to be operated almost anywhere. All that is required is a plug socket such as is conventional for electrical devices, and possibly a conventional extension cable. It is self-evident that the invention is not imperatively restricted to this particularly preferred type of electrical supply. The electrical supply can also be 3-phase and implemented with different voltages, depending on the power required in the specific situation and on the electrical supply that is available at the relevant location. Other voltages are self-evidently also possible, in particular in countries that use a different mains voltage in the public grid.

Alternatively, it has proven to be particularly expedient to equip the shrink fit apparatus with a battery that feeds same. Such a device can also be highly mobile. It is then expedient to provide a chassis, for example in the form of a highly maneuverable trolley, which in the lower region carries the battery, for example a vehicle starter battery, and for example in its upper region holds the shrink fit apparatus.

Protection is furthermore also claimed for an entire shrink fit system which is formed of a shrink fit apparatus of the type according to the invention and which is distinguished by the fact that the shrink fit system additionally includes different couplings which are fastenable to the shrink fit apparatus and by which the shrink fit apparatus can be fixed to the spindle of a machine tool.

This enables the shrink fit apparatus to be fastened to differently equipped machine tool spindles, such that it is no longer of importance whether the machine tool spindle, for pulling-in purposes, is equipped for example with an HSK coupling or a steep taper coupling.

Further structural possibilities, modes of functioning and advantages are apparent from the following description of the exemplary embodiments with reference to the figures.

An intermediate shell is preferably located between the first and second shells. The intermediate shell preferably serves as a coolant-conducting element in order to protect the second shell, or the semiconductor elements attached thereto, against overheating. By contrast to the second shell, the intermediate shell is preferably not split, in order to ensure a straightforward coolant guide. Therefore, the intermediate shell is either electrically (not thermally) insulated at least with respect to the second shell, or is formed of the electrically non-conductive material from the outset. It is self-evident that the coolant guide is sealed off with respect to the other components of the shrink fit apparatus. Alternative concepts for cooling the second shell without a specially formed intermediate ring are conceivable.

The intermediate shell may self-evidently also be configured to serve as a supplementary (additional) shield.

The invention is thus distinguished by simplicity, efficiency and effectiveness.

The above description of advantageous embodiments of the invention contains numerous features that have in part been combined with one another in the individual subclaims. These features may however expediently also be considered individually and combined to form meaningful further combinations.

Even where certain terms are used in the singular or in conjunction with a numeral in the description or in the patent claims, the scope of the invention is not intended to be restricted to the singular or to the relevant numeral for the terms. Furthermore, the words "a" or "an" are to be understood not as numerals but as indefinite articles.

The above-described characteristics, features and advantages of the invention, and the manner in which these are achieved, will become clearer and more comprehensible in the context of the following description of the exemplary embodiments of the invention, which will be discussed in more detail in conjunction with the drawings/figures (identical parts/components and functions are denoted by the same reference designations in the drawings/figures).

Other features which are considered as characteristic for the invention are set forth in the appended claims.

Although the invention is illustrated and described herein as embodied in a device for heat treatment and a method for operating the device, it is nevertheless not intended to be limited to the details shown, since various modifications and structural changes may be made therein without departing from the spirit of the invention and within the scope and range of equivalents of the claims.

The exemplary embodiments serve for explaining the invention and do not limit the invention to the combinations of features stated therein; this applies also to functional features. Furthermore, suitable features of each exemplary embodiment may also explicitly be considered in isolation, removed from an exemplary embodiment, introduced into another exemplary embodiment in order to supplement the same, and combined with any of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Shrink fit device with contactless temperature measurement (FIGS. 1 to 4)

Figure 1:
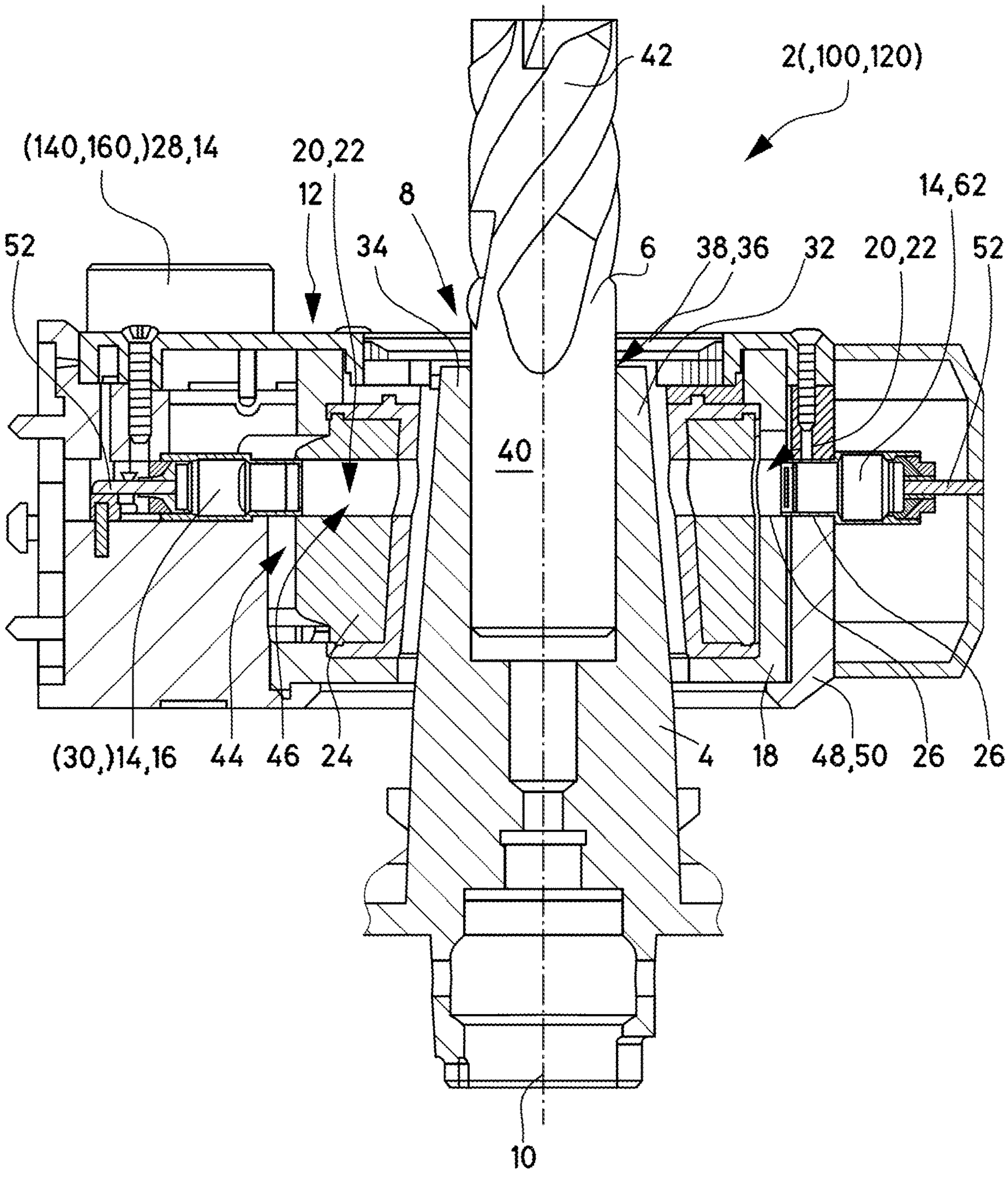
FIG. 1 is a diagrammatic, longitudinal-sectional view of a shrink fit device having an induction coil arrangement, equipped with multiple contactlessly measuring temperature sensors and a reflection sensor, according to an embodiment.

Referring now to the figures of the drawings in detail and first, particularly, to FIG. 1 thereof, there is seen a part of a shrink fit device 2 for the shrink-fitting or removal 120 of shank tools 6, or (as shown) of a milling tool 6, into or from a shrink chuck 4, specifically an induction coil arrangement 12 having multiple contactlessly measuring temperature sensors 16 and having a reflection sensor 62.

Figure 2:
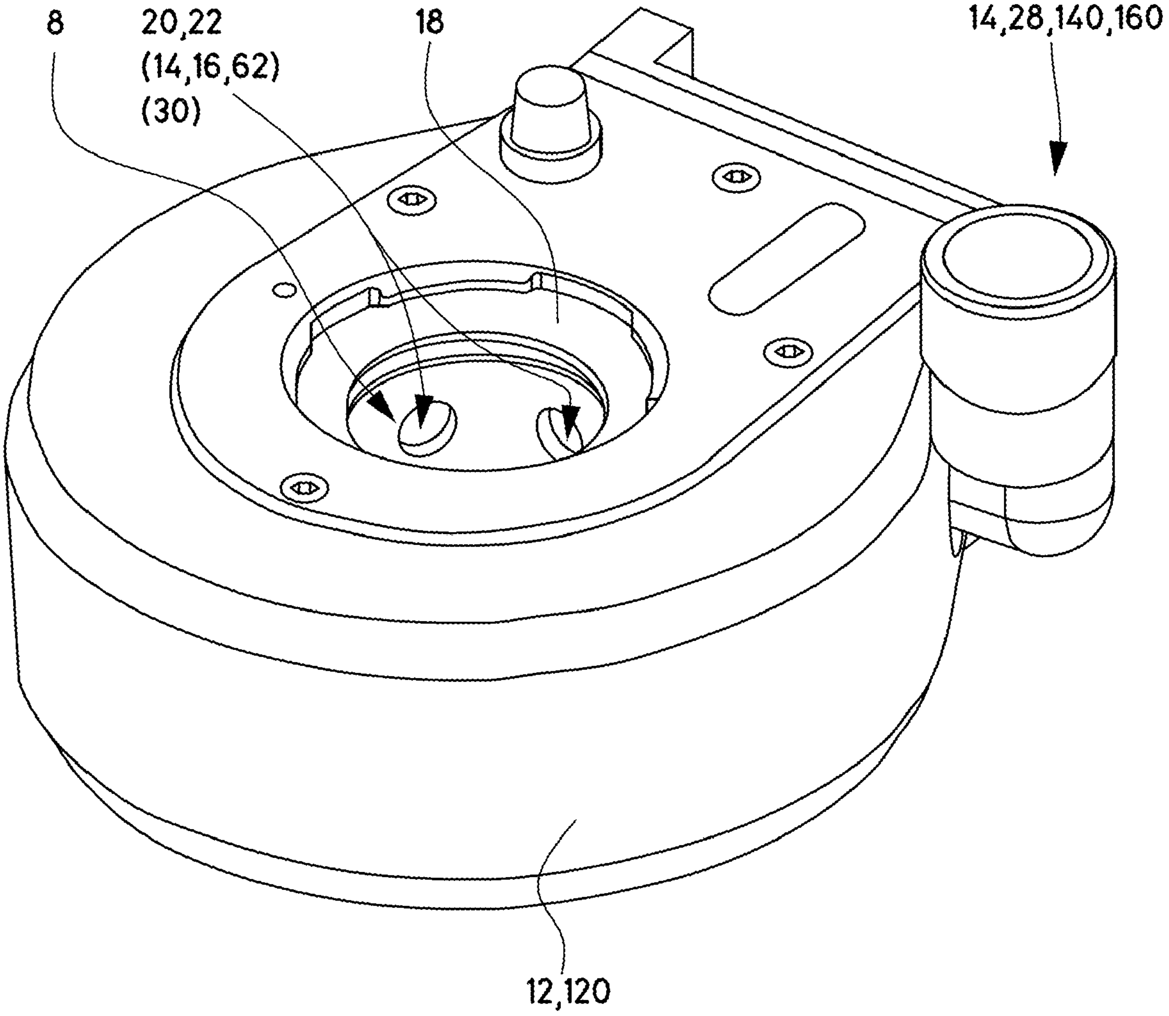
FIG. 2 is a perspective view of the induction coil arrangement of the shrink fit device according to FIG. 1.
Figure 3:
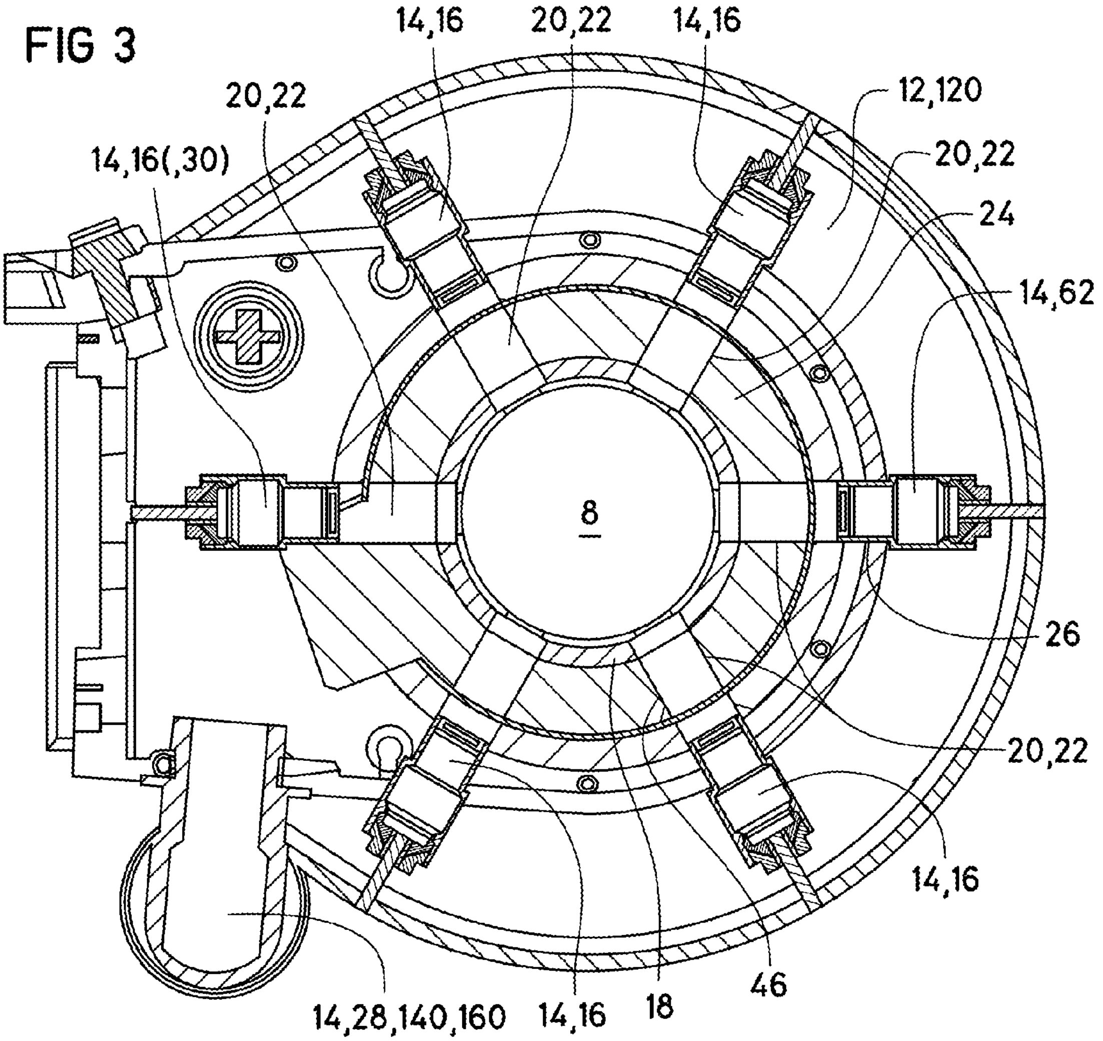
FIG. 3 is a radial section through the induction coil arrangement of the shrink fit device according to FIG. 1.
Figure 4:
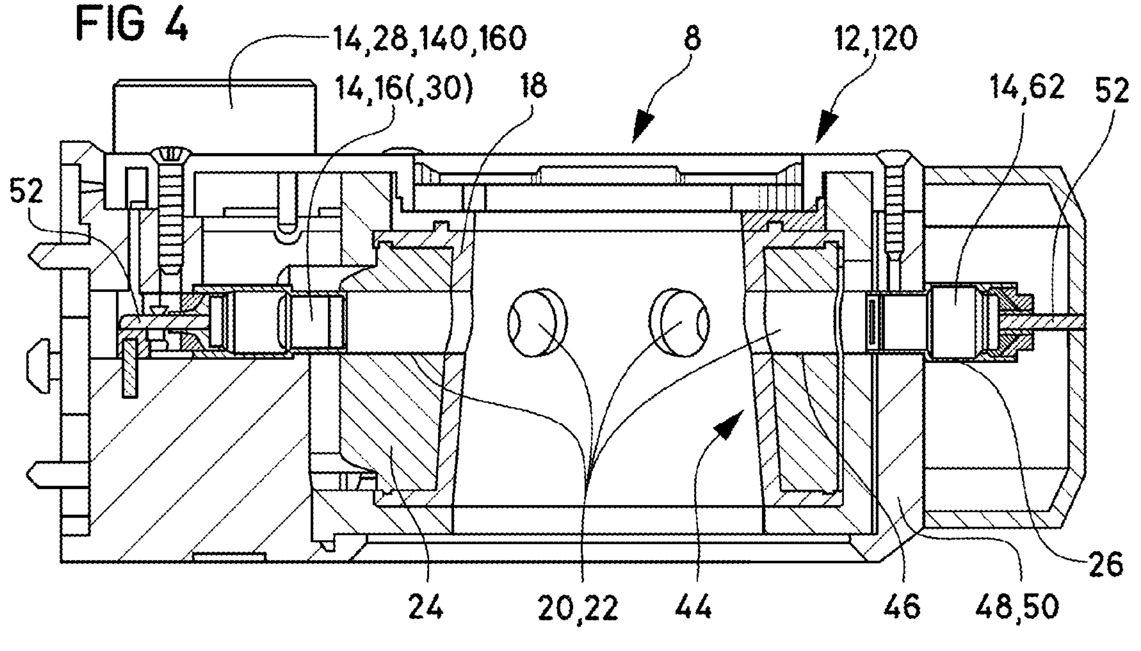
FIG. 4 is an axial section through the induction coil arrangement of the shrink fit device according to FIG. 1.

FIGS. 2 to 4 show the induction coil arrangement 12 in detail in various illustrations/sections.

As shown in FIG. 1, for the purposes of shrink-fitting or removal 120, the shrink fit device 2 has the induction coil arrangement 12, which is longitudinally movable along its coil axis 10 and which serves for inductively heating 120 the shrink chuck 4 (cf. in particular FIGS. 2 to 4), and a (schematically illustrated) control unit 28 for controlling 160 the operation on or heating of the shrink chuck 4, and a measuring/computing unit 14 for carrying out and evaluating measurements performed by the temperatures sensor 16 and/or by the reflection sensor 62.

The shrink chuck 4, which is in this case illustrated in FIG. 1, includes, as a sleeve section 32, a cylindrical hollow clamping region 34 which is accessible, via an end opening 36 at the front end 38 of the shrink chuck 4, for the insertion of the tool or milling cutter shank 40.

The clamping region 34 of the shrink chuck 4 has a somewhat smaller nominal diameter than the tool shank 40, such that the latter can be clamped in a manner known per se by (inductive) heating 120 of the shrink chuck 4. In the shrink-fitted state, the tool or milling cutter shank 40 is held rotationally conjointly, by frictional interference fit, for the purposes of transmitting a torque to the front working portion 42 of the rotary tool 6.

For removal, it is likewise the case that only the shrink chuck 4 is heated 120, on one side, until the thermal expansion releases the tool or milling cutter shank 40 again for the purposes of removal.

As shown in FIGS. 1 to 4, the induction coil arrangement 12 encloses, concentrically about its coil axis 10, a receiving opening 8 for the shrink chuck 4.

By virtue of the induction coil arrangement 12 being moved axially along its coil axis 10, the shrink chuck 4 is brought into the desired heating position relative to the induction coil arrangement 12 (cf. FIG. 1). For this purpose, it is also possible for stop elements, for example a pole disk, to be provided on the induction coil arrangement.

In order to generate an electromagnetic alternating field, the induction coil arrangement 12 includes a coil winding 24 in a coil housing 18, as can be seen in particular in FIGS. 1, 3 and 4.

In order to be able to detect the shell temperature of the shrink chuck 4 during the heating operation 120, multiple, in this case six, measuring channels 22, which each open into the receiving opening 8, extend through the induction coil arrangement 12 radially with respect to the coil axis 10.

In this case, as shown in FIGS. 3 and 4, the six measuring channels 22 are disposed, with an approximately uniform pitch about the coil axis 10 and at the same axial height with respect to the coil axis 10, in an axial central region 44 of the induction coil arrangement 12, between the axial ends thereof, wherein the coil winding 24 is wound around the six measuring channels 22 so as to leave these free. The coil-side inner portion 46 of the respective measuring channel 22 is aligned with an aperture 26 in the outer wall 48 of the induction coil housing 50 (and there is thus also a total of six apertures in the outer wall 48 of the induction coil housing 50).

Into five of the six apertures 26 of the induction coil housing 50, there is inserted in each case one contactlessly measuring temperature sensor 16, in this case a radiation detector 16 (or optionally pyrometer 30), which (contactlessly) measures thermal radiation and which, through its individual measuring channel 22 in the coil winding 24, detects thermal radiation that is emitted by the shrink chuck 4. Into the sixth of the six apertures 26 of the induction coil housing 50, there is inserted an infrared reflection sensor 62 which, through its measuring channel 22 in the coil winding 24, likewise performs a reflection measurement (on the shrink chuck 4).

The control unit 28 and the measuring/computing unit 14 are, at the input side, coupled by cables 52 to the temperature sensors 16 and the reflection sensor 62 and thus receive the measurement signals thereof, which are processed 140 jointly in the measuring/computing unit 14 to give a resulting shell/surface temperature of the shrink chuck 4 that is to be measured.

Then, on the basis of the ascertained resulting shell/surface temperature of the shrink chuck 4 that is to be measured, a shrink-fitting operation can be performed in the shrink chuck 4 by the control unit 28.

Here, during the heating 120 of the shrink chuck 4, (automatic) temperature control may be performed on the basis of the ascertained resulting shell temperature, for example by virtue of the supply of current to the induction coil arrangement being influenced 160 by the control unit 28 in a manner dependent on the resulting shell temperature.

In order to ascertain the resulting shell/surface temperature by the temperature sensors 16 and the reflection sensor 62, the following approach is provided:

Firstly, in a manner initiated by the measuring/computing device 14, a test pulse, that is to say a current of known current magnitude, current form, frequency and effective period, is applied to the induction coil arrangement 12 before the start of an actual heat treatment operation on the shrink chuck 4 that has been inserted into the induction coil arrangement 12.

For this test pulse, a time/current curve for the shrink chuck 4 that has been inserted into the induction coil arrangement 12 is ascertained. The overall time/current curve ascertained for the test pulse is taken as a magnetic fingerprint for the shrink chuck 4 that has been inserted into the induction coil arrangement 12.

Using the magnetic fingerprint, an item of geometrical information, such as in this case an outer diameter, for the shrink chuck 4 that has been inserted into the induction coil arrangement 12, is then ascertained.

Furthermore, a reflection measurement is then performed, by the reflection sensor 62, on the shrink chuck 4 that has been inserted into the induction coil arrangement 12, wherein the reflection measurement by the reflection sensor 62 is corrected by using the item of geometrical information (corrective value 1).

Subsequently, using the corrected reflection measurement (corrective value 2), the temperature measurements are performed by the temperature sensors 16 and corrected.

The resulting shell temperature of the shrink chuck 4 is then ascertained from the corrected temperature measurements by the temperature sensors.

Shrink fit device with cooling device with contactless temperature measurement (FIGS. 5 to 8)

Figure 5:
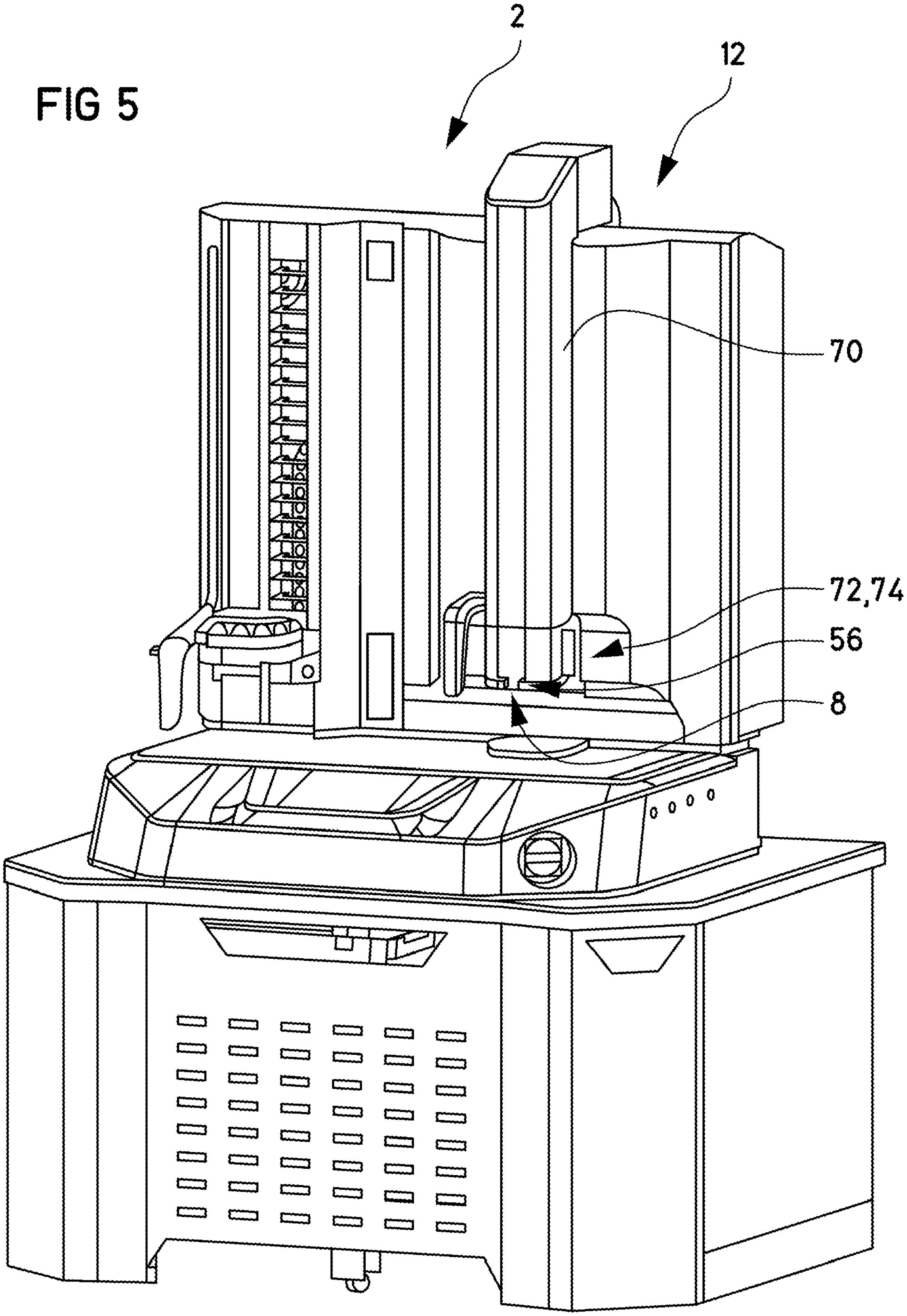
FIG. 5 is a perspective illustration of a shrink fit device with a cooling device, and with a measuring ring integrated into the cooling device, according to an embodiment.
Figure 6:
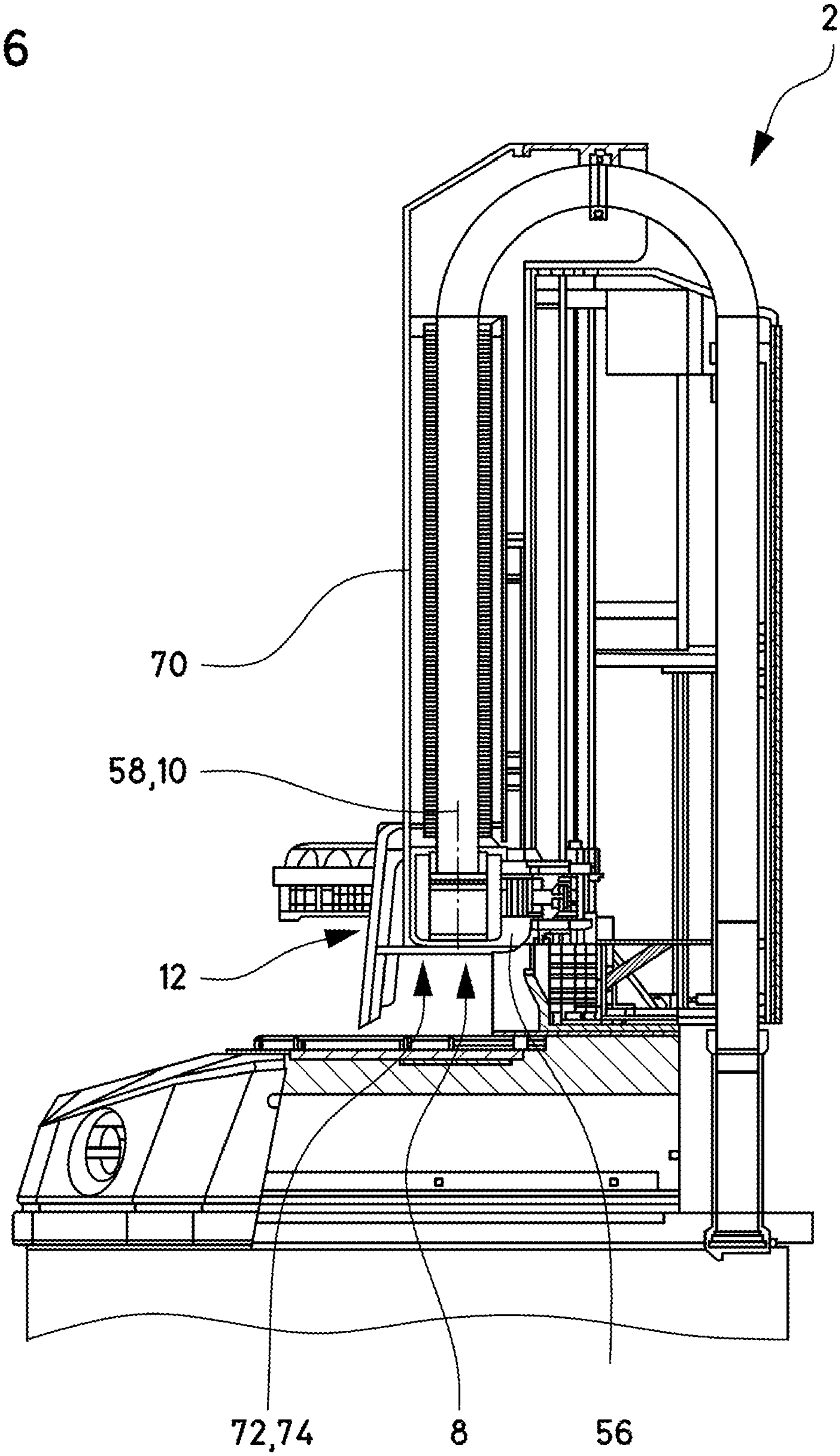
FIG. 6 is a side-elevational view of the shrink fit device with a cooling device, and with the measuring ring integrated into the cooling device, according to FIG. 5.

FIGS. 5 and 6 show a shrink fit device 2 having a cooling device 12, as is shown and described in detail in European Patent Application EP 3 444 064 A1, corresponding to U.S. Pat. No. 11,141,797, (see FIGS. 1 and 4 and paragraphs [0014] to [0026] of European Patent Application EP 3 444 064 A1, corresponding to U.S. Pat. No. 11,141,797), the content of which is hereby incorporated into this application (reference document).

As shown in FIG. 5 (cf. also FIG. 4 of European Patent Application EP 3 444 064 A1, corresponding to U.S. Pat. No. 11,141,797, (reference document)) and FIG. 6 (cf. also FIG. 1 of EP European Patent Application 3 444 064 A1, corresponding to U.S. Pat. No. 11,141,797, (reference document)), the cooling device 12 has a cooling head 72 which is guided movably on a frame or column 70 and which includes a cooling attachment 74, which can be mounted at least onto that part of the shrink chuck 4 which is to be cooled. The cooling attachment 74 includes a receiving opening 8 (cf. passage opening 6 in European Patent Application EP 3 444 064 A1, corresponding to U.S. Pat. No. 11,141,797), the inner contour/diameter of which is adapted to the outer contour/diameter of that part of the shrink chuck 4 (not illustrated) which is to be cooled, such that the cooling attachment 74 can be pushed/mounted onto a shrink chuck 4 that is to be cooled.

For further details regarding the shrink fit device 2 and its cooling device 12, reference is made to European Patent Application EP 3 444 064 A1, corresponding to U.S. Pat. No. 11,141,797, (see FIGS. 1 and 4 and [0014] to [0026] of European Patent Application EP 3 444 064 A1, corresponding to U.S. Pat. No. 11,141,797).

As is also shown in FIGS. 5 and 6, a measuring or sensor ring 56 (cf. FIG. 7, with an alternative sensor ring being shown in FIGS. 9*a* and 9*b*), which is open over a particular circular ring segment, is integrated into the cooling attachment 74 and can be used to contactlessly measure the shell temperature of a shrink chuck 4 that is received in the cooling attachment 74 or the receiving opening 8 thereof. This integration is specifically such that, at the lower edge of the cooling attachment 74, the measuring ring 56 (cf. FIG. 7) is disposed coaxially (by way of its central axis 58) with respect to the central axis 10 of the cooling head 72 or cooling attachment 74.

Here, the inner diameter of the measuring ring 56 is substantially equal to that of the cooling attachment 74 (at the lower end thereof), whereby the measuring ring becomes part of the receiving opening 8.

Figure 7:
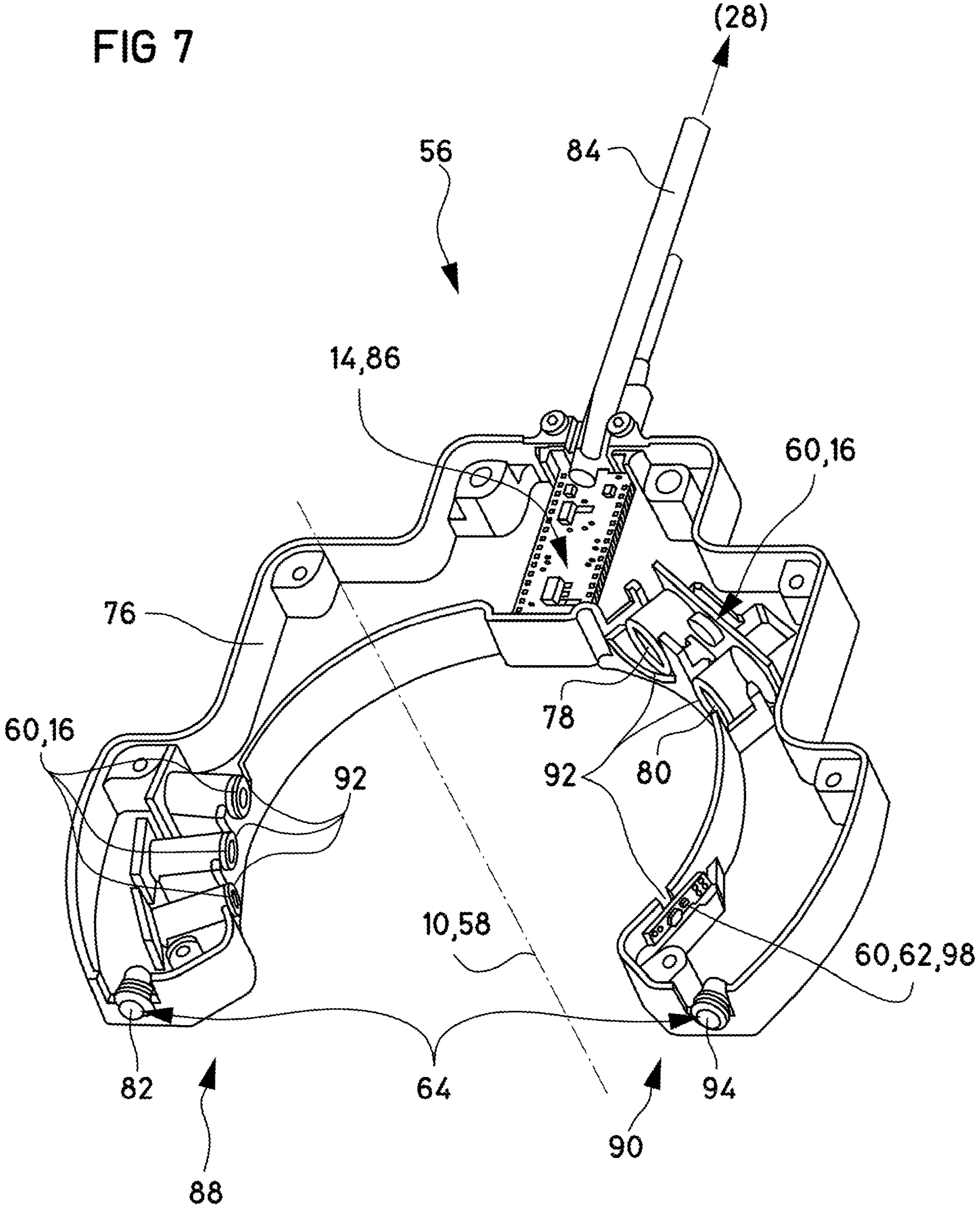
FIG. 7 is a perspective view of the measuring ring of the shrink fit device according to FIG. 5.

FIG. 7 shows the measuring ring 56 in detail in a state in which it has been "upwardly" cut away, providing a view into a housing 76 of the measuring ring 56.

As illustrated in FIG. 7, the measuring ring 56 is an approximately closed annular body, with two ring arms 88, 90 situated opposite one another at its open segment.

As is also shown in FIG. 7, various types of sensors 60, 16, 62 are received in the measuring ring housing 76 that forms the body of the measuring ring 56, specifically three mutually adjacently disposed infrared temperature sensors 16 in a left-hand arm 88 of the measuring ring 56 that is graphically illustrated in FIG. 7, and a further infrared temperature sensor 60, 16 (including a transmitter 78 and a receiver 80), and a reflection sensor 60, 62, in a right-hand arm 90 of the measuring ring 56 that is graphically illustrated in FIG. 7.

All of these sensors 60, 16, 62 are received in the measuring ring 56 or in the housing 76 thereof such that the measuring direction of each of the sensors is directed radially toward the central axis 58, 10. For this purpose, the measuring ring housing 76 also provides radially inner passages or openings 92 through which the sensors 60, 16, 62 disposed at the passages or openings can perform measurement in a radially inward direction.

In an embodiment that is not illustrated, the sensors 60, 16, 62 may also be oriented substantially perpendicularly to the outer shell of the shrink chuck 4, which in many cases is conical.

The sensors 60, 16, 62 are connected by non-illustrated lines to a microcontroller 86 which is likewise received in the measuring ring 56 or in the housing 76 thereof (and which has a measuring/computing unit 14 for carrying out and evaluating measurements that are performed by the temperature sensors 16 and the reflection sensor 62), such that measurement signals from the sensors 60, 16, 62 can be fed to the microcontroller in order to be processed, in this case in particular in order to ascertain 140 a resulting shell temperature of a shrink chuck 4 that is received in the cooling attachment 74.

The microcontroller 86 is in turn connected via a supply line 84 to a control unit 28, or controller 28 for short, of the cooling device 12, to which the microcontroller transmits its signals, such as the resulting shell temperature. The controller 28 can then control 160 a cooling operation 120 (on a shrink chuck 4 that is received in the cooling attachment 74) in a manner dependent on presently ascertained shell temperatures.

As is also shown in FIG. 7, the measuring ring 56 provides an LED (thermal) status display 64 in the form of two colored LEDs 82, 94 which are disposed on the ends of the two arms 88, 90 and are thus visible to a user, and of which one is red 82 and the other is green 94, and which, being likewise connected via the microcontroller 86 to the controller 28, are also controlled by the controller 28.

An illuminated green LED 94 indicates a thermal state of a shrink chuck 4 which has for example been cooled to such a degree that it can be safely touched using a bare hand; an illuminated red LED 82 indicates a thermal state of a shrink chuck 4 that has not yet (sufficiently) cooled down. Red flashing of the red LED 82 indicates an active cooling operation by the cooling device 12.

Figure 8:
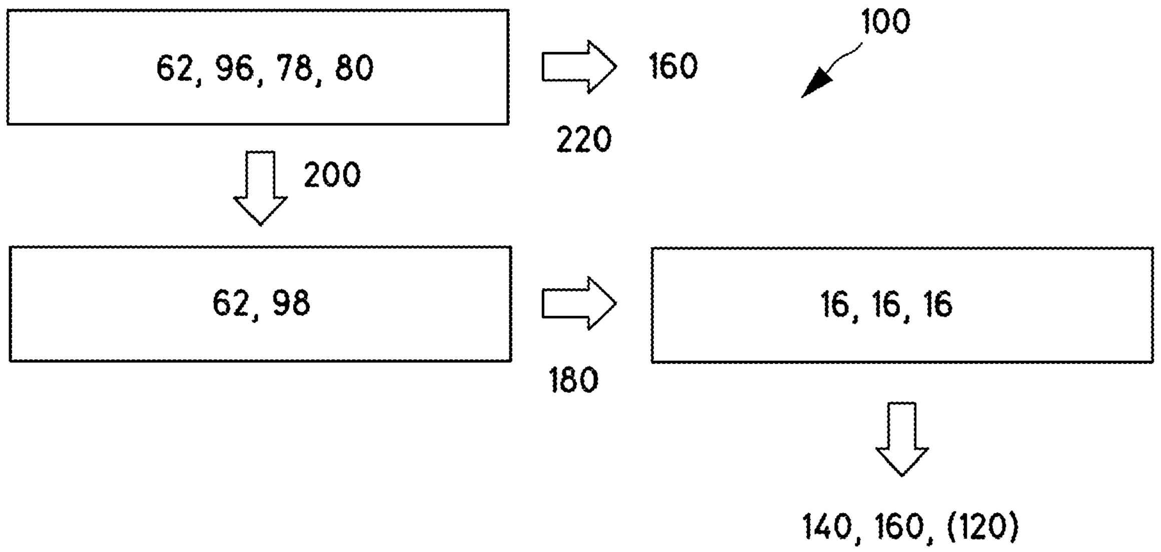
FIG. 8 is a schematic block diagram illustrating the functioning of the measuring ring of the shrink fit device according to FIG. 5.

FIG. 8 illustrates the functioning 100 and the interaction 200 of the various sensors 60, 16, 62 during their measurements or during the ascertainment 140 of the shell/surface temperature of a shrink chuck 4 which is to be cooled by cooling, or which is received in the cooling attachment 74, and the control 160.

The measuring ring 56 or the sensors 60, 16, 62 (and light-emitting diodes 82, 94) thereof are active, or are switched into an active state, (1) as soon as the cooling attachment 74 with integrated measuring ring 56 is moved downward, from above, over the shrink chuck 4 that is to be cooled, (2) during the cooling operation 120, in which the shrink chuck 4 is received in the cooling attachment 74 (and is cooled in a manner controlled by the controller 28 (note: the controller 28 sets the cooling parameters, such as a cooling duration etc., possibly using the ascertained surface temperature or surface color of a shrink chuck 4)), and (3) until the cooling attachment 74 with integrated measuring ring 56 has been completely lifted off, by being pushed upward, from the shrink chuck 4 (this being referred to overall as "measuring phase"/"measuring cycle," for example).

The start and the end of the measurements or of the measuring phase ((1) to (3)) may be ascertained (automatically) by the reflection sensor 62, which identifies 220, by simple reflection measurement, whether a shrink chuck 4 is situated in the measuring ring 56.

During the temperature measurement or temperature ascertainment 140 (which is performed and controlled by the measuring/computing unit 14), a test pulse, that is to say a current (test pulse) of known current magnitude, current form, frequency and effective period, is applied to the shrink chuck before the start of an actual cooling operation.

For this test pulse, a time/current curve is ascertained, and the overall time/current curve is taken as a magnetic fingerprint for the shrink chuck 4.

Using the magnetic fingerprint, an item of geometrical information, in this case the outer diameter, for the shrink chuck 4 is ascertained.

Furthermore, a reflection measurement is performed on the shrink chuck using the reflection sensor 62, wherein an item of reflection information, such as the emissivity, is ascertained for the shrink chuck.

Temperature measurements are then performed on the shrink chuck using the temperature sensors 16, with the item of geometrical information, or the outer diameter, and the item of reflection information, or the emissivity, being taken into consideration in each case.

A resulting shell temperature of the shrink chuck can then be calculated from the temperature measurements, for example by averaging.

Then, on the basis of the thus ascertained surface/shell temperatures of a shrink chuck 4 that is situated in the measuring ring 56, the cooling 120 is controlled 160 and the LED (thermal) status display light-emitting diodes 82, 94 and 64 are actuated 160 in accordance with the ascertained surface/shell temperatures.

Specifically, the light-emitting diodes may be controlled such that, (1) when the cooling attachment 74 with the measuring ring 56 is initially pushed over the (hot) shrink chuck 4 that is to be cooled, the red light-emitting diode 82, illuminated red, indicates the hot state of the shrink chuck 4 or of the surface/shell thereof.

When the cooling attachment 74 has then been pushed entirely over the shrink chuck 4 and the cooling operation 120 is started (2), the red light-emitting diode 82 flashes during the cooling operation 120 and indicates the "cooling" 120.

When the cooling operation 120 has come to an end and the cooling attachment 74 has been raised upward (3), the red light-emitting diode 82 illuminates if the shrink chuck 4 is still too hot, and the green light-emitting diode 94 illuminates when the shrink chuck 4 has sufficiently cooled down. If the light-emitting diode 82, illuminated red, indicates that the shrink chuck 4 is still too hot, the cooling attachment 74 can be pushed downward over the shrink chuck 4 again, and a further cooling operation 120 can be performed.

If necessary, it is also possible for the entire cooling operation 120 to be automatically coupled to the temperature ascertainment 140 and controlled 160 on the basis thereof.

It is additionally pointed out that a measuring ring 56 corresponding to the measuring ring 56 described above may also be disposed at an induction coil arrangement 12 of a/the shrink fit device 2 in order to measure the shell temperatures of the shrink chucks 4 that are received in the receiving opening 8 of the induction coil arrangement 12 (cf. FIGS. 1 to 4). A measuring ring 56 corresponding to the measuring ring 56 described above may correspondingly also be disposed at independent or individually operating, separate cooling devices 12.

Figure 9A:
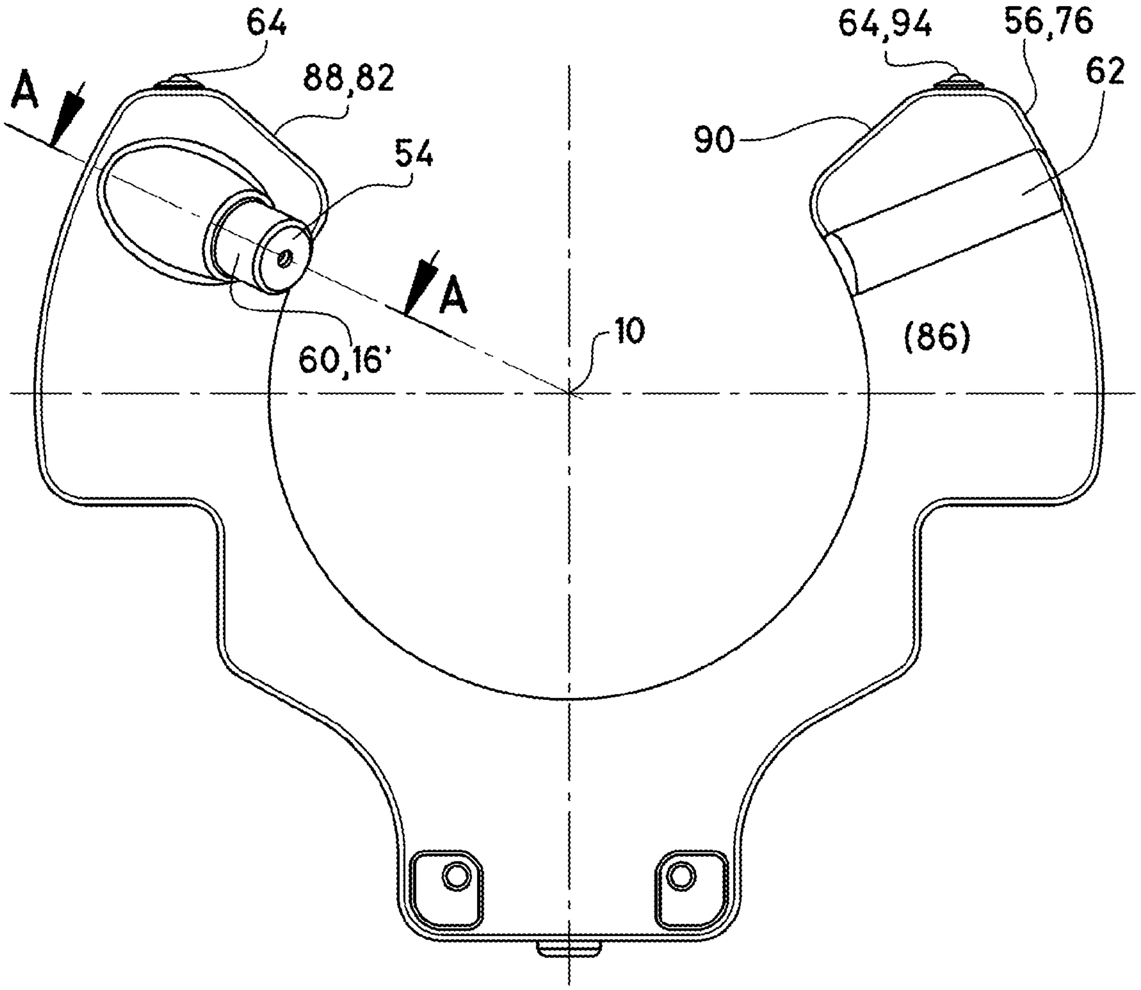
FIGS. 9*a* and 9*b* are respective plan and sectional views of a further measuring ring in two illustrations.
Figure 9B:
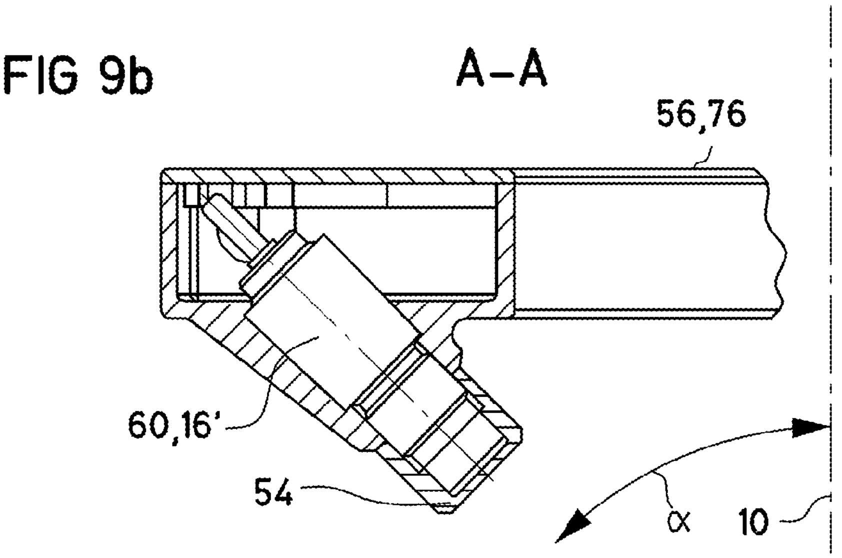

FIGS. 9*a* and *b* show an alternative measuring ring 56 which can be or is used in the same way in terms of its function and which can be integrated into the cooling attachment 74, in an overall view in FIG. 9*a* and in a detail view, in which it has been "upwardly" cut away, in FIG. 9*b*.

As illustrated in FIG. 9*a*, this measuring ring 56 is also an approximately closed annular body, with two ring arms 88, 90 situated opposite one another at its open segment.

As is also shown in FIG. 9*a* (and in detail in FIG. 9*b*), a (single) temperature sensor 60, specifically an infrared temperature sensor 16', is received in the measuring ring housing 76 that forms the body of the measuring ring 56, specifically in a left-hand arm 88 of the measuring ring 56 that is graphically illustrated in FIG. 9*a*. A reflection sensor 62 is received, as is schematically indicated, in the right-hand arm 90 of the measuring ring 56 that is graphically illustrated in FIG. 9*a*.

Regardless of this, holding devices other than the measuring ring 56 may also be provided for the temperature sensor 16'.

The temperature sensor 60 or 16' is equipped with a diaphragm 54.

By contrast to the measuring ring 56 described above (according to FIG. 7), this temperature sensor 60 or 16' is received in the measuring ring housing 76 so as to be inclined at an angle α of approximately 45° with respect to the central axis 10.

The temperature sensor 60 or 16' and the reflection sensor 62 are connected by non-illustrated lines to a microcontroller 86 which is likewise received in the measuring ring 56 or in the housing 76 thereof (and which has a measuring/computing unit 14 that is not visible), such that measurement signals from the temperature sensor 60 or 16' and the reflection sensor 62 can be fed to the microcontroller in order to be processed, in this case in particular in order to ascertain 140 the shell temperature of a shrink chuck 4 that is received in the cooling attachment 74.

The microcontroller 86 is in turn connected (in a manner which is not visible) via a supply line 84 to a control unit 28, or controller 28 for short, of the cooling device 12, to which the microcontroller transmits its signals, such as the shell temperature.

The controller 28 can then control 160 a cooling operation 120 (on a shrink chuck 4 that is received in the cooling attachment 74) in a manner dependent on the present shell temperatures.

As is also shown in FIG. 9*a*, the measuring ring 56 provides an LED (thermal) status display 64 in the form of two colored LEDs 82, 94 which are disposed on the ends of the two arms 88, 90 and are thus visible to a user, and of which one is red 82 and the other is green 94, and which, being likewise connected via the microcontroller 86 to the controller 28, are also controlled by the controller 28.

An illuminated green LED 94 indicates a thermal state of a shrink chuck 4 which has for example been cooled to such a degree that it can be safely touched using a bare hand; an illuminated red LED 82 indicates a thermal state of a shrink chuck 4 that has not yet (sufficiently) cooled down. Red flashing of the red LED 82 indicates an active cooling operation by the cooling device 12.

Figure 10:
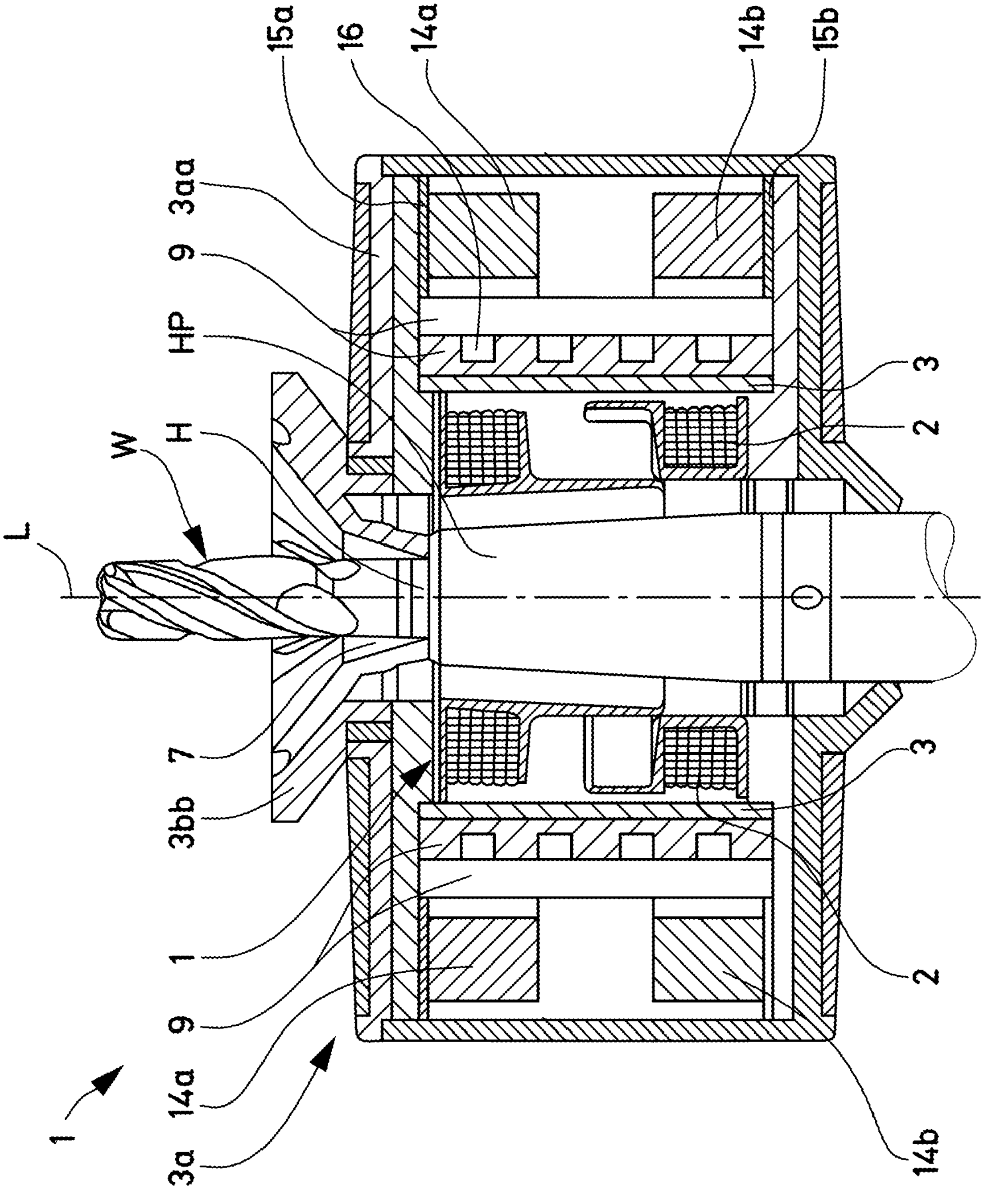
FIG. 10 is a longitudinal-sectional view of a first exemplary embodiment taken through the center.

FIG. 10 gives a first fundamental overview of the apparatus according to the invention.

The basic principle of inductive shrink-fitting and removal

It is possible here to clearly see the induction coil 1 with its individual windings 2, into the center of which a tool holder 4 is inserted in order to shrink-fit or remove the retaining shank H of a tool W into or from the sleeve section HP having a diameter D1 or D2. The functional principle on which the shrink-fitting and removal are based is described in more detail in the German patent application DE 199 15 412 A1, corresponding to U.S. Pat. Nos. 6,712,367 and 6,991,411. The content of the document is hereby incorporated into the subject matter of this application.

The shielding of the induction coil using magnetically conductive and electrically non-conductive measures The present invention places high demands on the shielding of the induction coil, including on the conventional shielding of a type which is already known.

On its outer periphery, the induction coil is equipped with a first shell 3 composed of electrically non-conductive and magnetically conductive material. Typically, the first shell 3 is formed either of a ferrite or a metal powder or metal sintered material, the individual particles of which are separated from one another in electrically insulated fashion and are thus, considered as a whole, magnetically conductive and electrically non-conductive. In order to rule out attempts at circumvention motivated by the aim of obtaining patent protection, note that, in exceptional cases, a laminated shell composed of layered transformer sheets separated from one another by insulating layers is also conceivable instead. In the majority of cases, however, such a laminated shell will not serve the desired purpose.

The first shell 3 is particularly preferably configured to be completely closed in a peripheral direction, that is to say to completely cover the peripheral surface of the coil, such that, in theory, there are also no remaining "magnetic gaps,"

aside from irrelevant local apertures such as individual and/or small local bores or the like.

In exceptional cases, it is conceivable to construct the shell 3 such that it is formed of individual segments which cover the periphery and which have certain free spaces between them (not illustrated in the figures). This allows rudimentary functioning in some cases if the radial thickness of the individual segments is selected to be so large in relation to the dimension of the free spaces that the field entering the respective free spaces from the inside is attracted by the segments already in the region of the free space, such that no significant stray field can pass through the free spaces.

The shield composed of magnetically conductive and electrically non-conductive material preferably does not end at just the first shell.

Instead, at least one, preferably both, end side(s) of the first shell 3 is or are adjoined by a magnetic cover 3*a*, 3*b* composed of the material, which covers generally make contact with the first shell 3.

On that end side of the induction coil which faces away from the tool holder, the magnetic cover 3*a* is preferably configured as an entirely or preferably partially exchangeable pole shoe, that is to say as an annular structure with a central opening that forms a passage for the tool that is to be shrink-fitted or released. The expression "exchangeable" preferably describes exchangeability without the use of tools, which is ideally implemented by way of a connection that can be actuated by hand, for example a bayonet connection. In this way, it is possible to process tool holders that receive different tool shank diameters. It is nevertheless ensured that the end side of the respective sleeve section HP makes contact, on the coil inner side, with the pole shoe.

On that end side of the induction coil which faces toward the tool holder, the magnetic cover 3*b* is preferably configured as an intrinsically planar annular disk which ideally engages fully over the windings of the induction coil and has a central passage for the sleeve section.

For the invention, it is not obligatory but it is highly advantageous if the magnetic covers 3*a*, 3*b* provided at the end sides project (at least locally, preferably over at least 75%, and ideally in fully encircling fashion) in a radial direction beyond the first shell 3, preferably to a radial extent that is several times greater than, in many cases at least 4 times, the radial thickness of the first shell 3. The radial protrusion should preferably run at an angle of 75° to ideally 90° with respect to the longitudinal axis L. This gives rise to a reinforced "shielded trough" which runs in encircling fashion in a peripheral direction around the coil, and whose function according to the invention will be discussed in more detail further below.

FIG. 10 shows a particularly preferred embodiment, in which the pole shoe is formed of a pole annular disk 3*aa* which remains permanently in position and which is covered on an outer side with an insulating material, for example plastics. A shielding collar 3*bb* is fastened exchangeably to the pole annular disk 3*aa*. As can be seen, the pole annular disk 3*aa* and the shielding collar 3*bb* are preferably connected to one another in magnetically uninterrupted fashion. This is achieved by virtue of the shielding collar making contact with the pole annular disk, preferably by lying on top of same.

As is likewise shown in FIG. 10, it can be particularly expedient if the shielding collar has a stop portion AS for abutting against the sleeve section, which stop portion projects into the interior of the induction coil.

As can likewise be seen clearly from FIG. 10, it is in many cases particularly expedient if the shielding collar is divided up into individual segments which are movable obliquely with a movement component in a radial direction and a movement component in a direction parallel to the longitudinal axis L, such that both the free inner diameter of the shielding collar that is available as a tool passage, and the depth to which that end of the shielding collar which faces toward the sleeve section protrudes into the interior of the induction coil, are adjustable.

Ideally, the shielding collar has, at any rate, a conical construction or a profile which widens in the direction of the coil longitudinal axis toward the tool tip.

In order to ensure the particularly high-quality shielding that is desirable for the purpose according to the invention, the shielding collar projects in the direction of the longitudinal axis L beyond the free end side of the sleeve section of the tool holder by at least two times, preferably by at least 2.75 times, the magnitude of the tool diameter.

The additional shielding using electrically conductive and magnetically non-conductive measures Even thorough shielding by the first shell 3 and the magnetic covers 3*a*, 3*b* cannot prevent a certain stray field, which is damaging to semiconductor components, from arising at the outer periphery of the induction coil or at or in the region of the peripheral surface of the first shell 3. For this reason, electronic components that are sensitive to disturbance voltages induced by the stray field must not in fact be disposed in this region. This applies in particular to semiconductor components that form a major part of the resonant circuit, which is operated close to resonance and which is used to feed the induction coil.

In order to yet further improve the shielding, provision is made according to the invention for the induction coil and its first shell 3 to be surrounded at its outer periphery by a second shell 9, preferably, at least if cooling of the second shell is omitted, such that the first and the second shell are in contact with one another, ideally over the predominant part, or entirety, of their mutually facing peripheral surfaces.

The second shell 9 is produced from magnetically non-conductive and electrically conductive material. "Electrically conductive" is to be understood here to mean a material that exhibits not only local or "granular" electrical conductivity, so to speak, but a material that allows the formation of eddy currents to the extent that is relevant for the invention; more on this below.

The special aspect of the second shell is that it is preferably configured in such a way, and preferably has such a thickness in a radial direction, that eddy currents are generated therein under the influence of the stray field, which passes through the second shell, from the induction coil, which eddy currents cause the undesired stray field to be attenuated. The principle of active shielding by way of an opposing field is thus utilized here. It can thus be achieved that, at the outer surface of the second shell, the stray field is reduced by more than 50%, ideally by at least 75%. It is crucial that, at any rate, the stray field is reduced at the surface of the second shell to such an extent that semiconductors can be safely disposed there.

It is crucial that the second shell is separated in a radial direction, or magnetically, from the induction coil by the first shell, because the second shell would otherwise heat up to too great a degree, which is not the case here because the second shell is situated not in the main field but only in the stray field.

For the term "shell" used here in conjunction with the second shell, the definition given above in conjunction with the first shell applies analogously. However, in the context of the second shell, the term "shell" does not mean that a peripherally endless tube section must be used. Instead, the shell is preferably divided up into individual segments that are electrically insulated with respect to one another, for example by joints that are filled with adhesive or plastics. This construction serves to prevent a series short circuit, such as would result in the case of an endless tube portion if a dielectric breakdown were to occur in the second shell at a power semiconductor component, and all power semiconductor components along the second shell are connected to the same potential.

It is however important that the individual segments are each of such a size that the stray field can induce field-attenuating eddy currents therein; in some cases, there is no need for a solid shell, but a conductive lattice structure of adequate thickness (in view of the specific individual conditions) can suffice.

It is to be noted at this juncture that a housing which is provided merely for mechanical protection purposes and which has thin walls in a radial direction is not sufficient, even if it were to be formed of electrically conductive material. To achieve the desired effect according to the invention, a targeted construction of the radial wall thickness of the second shell is necessary.

A preferred material for producing the second shell 9 is aluminum.

The second shell 9 may, in its interior, have cooling channels which run preferably in a peripheral direction and which are optionally of helically encircling form, and which in the latter case ideally form a thread.

In this case, it is particularly expedient for the second shell 9 to be formed of two or more parts. The first part of the second shell then bears cooling channels which are formed therein at its periphery and which are sealed off by the second part of the second shell.

Figure 11:
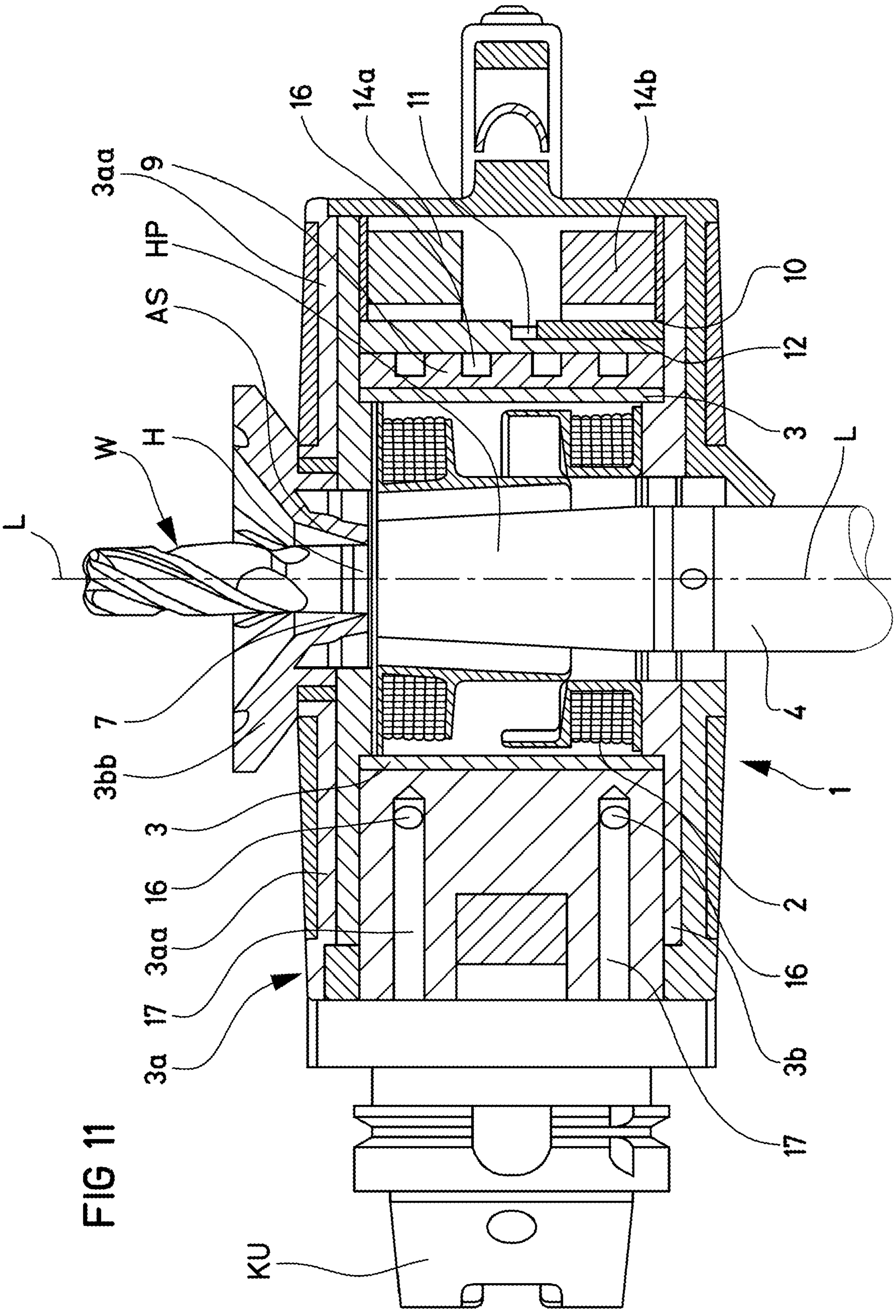
FIG. 11 is a longitudinal-sectional view of the first exemplary embodiment taken through the center that has been rotated through 90° about the longitudinal axis L in relation to FIG. 10.
Figure 13:
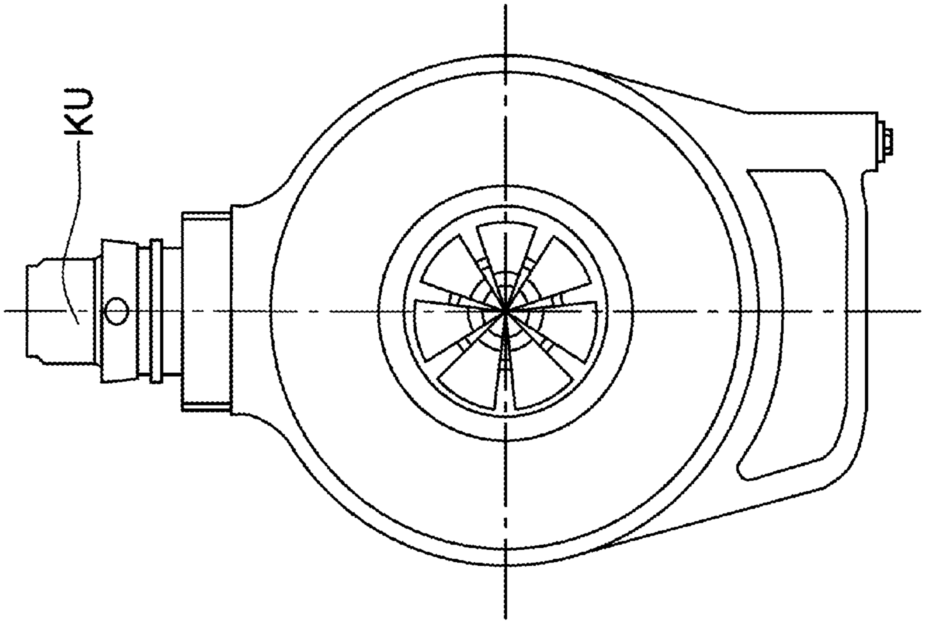
FIG. 13 is a plan view of the first exemplary embodiment taken frontally from above, with a shielding collar having been mounted.
Figure 12:
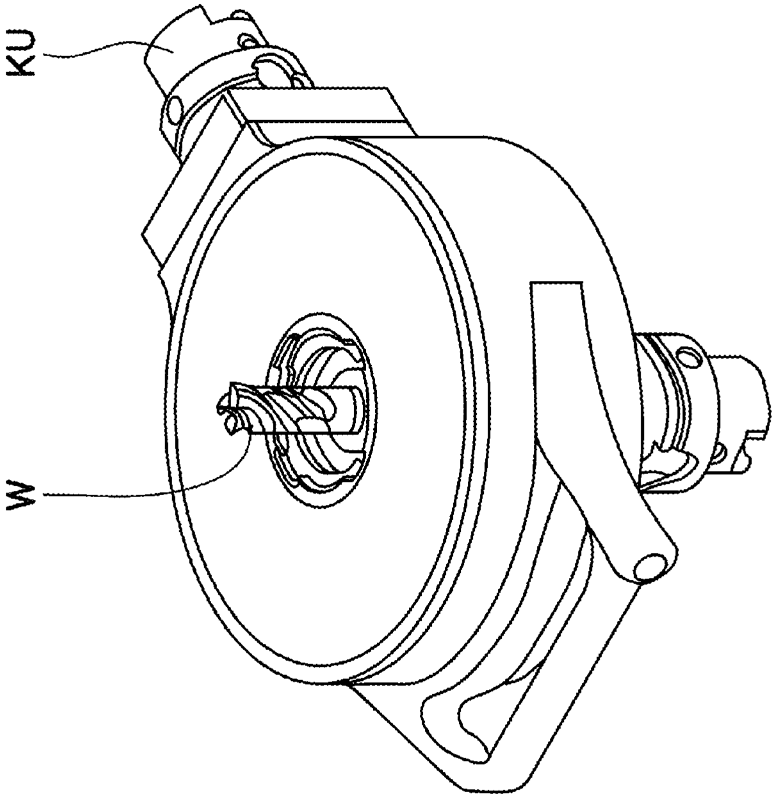
FIG. 12 is a perspective view of the first exemplary embodiment taken obliquely from above, with a shielding collar having been removed.

At this juncture, reference is made to the left-hand part of FIG. 11. It is possible here to see the coolant feed lines 17, which feed fresh coolant in at the start of the one or more cooling channels 16 and discharge consumed coolant.

The special arrangement of the power semiconductor components, of the capacitors and optionally of the electronic controller As can be clearly seen from FIG. 11 and FIG. 14, the second shell is surrounded at its periphery by the power semiconductor components 10, which will be discussed in more detail below and which are disposed directly at the outer periphery of the second shell.

In the present case, the power semiconductor components have two large main surfaces and four small side surfaces. The large main surfaces are preferably more than four times larger than each of the individual side surfaces. The power semiconductor components 10 are disposed such that one of their large main surfaces is in thermally conductive contact with the second shell 9, generally at the outer periphery thereof.

Ideally, the relevant large main surface of the power semiconductor component 10 is adhesively bonded to the peripheral surface of the second shell 9 using a thermally conductive adhesive. The second shell 9 thus performs a dual function here. It thus not only improves the shielding, thus allowing the power semiconductor components to be disposed in its radial vicinity (at a distance of less than 10 cm from its peripheral surface), but optionally simultaneously functions as a cooling element for the power semiconductor components.

Figure 14:
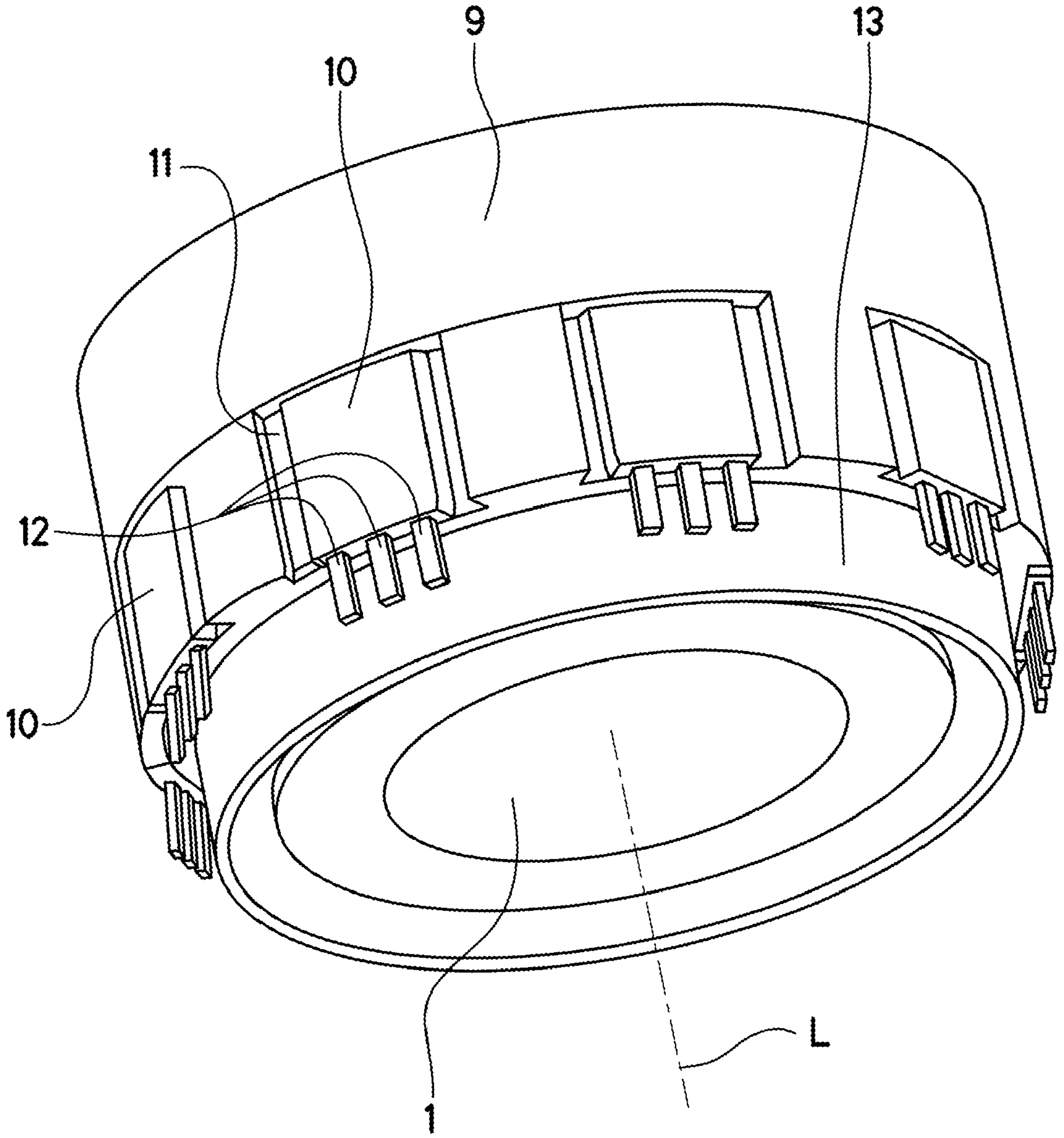
FIG. 14 is a perspective view of the second shell of the first exemplary embodiment, equipped with power semiconductor elements.
Figure 15:
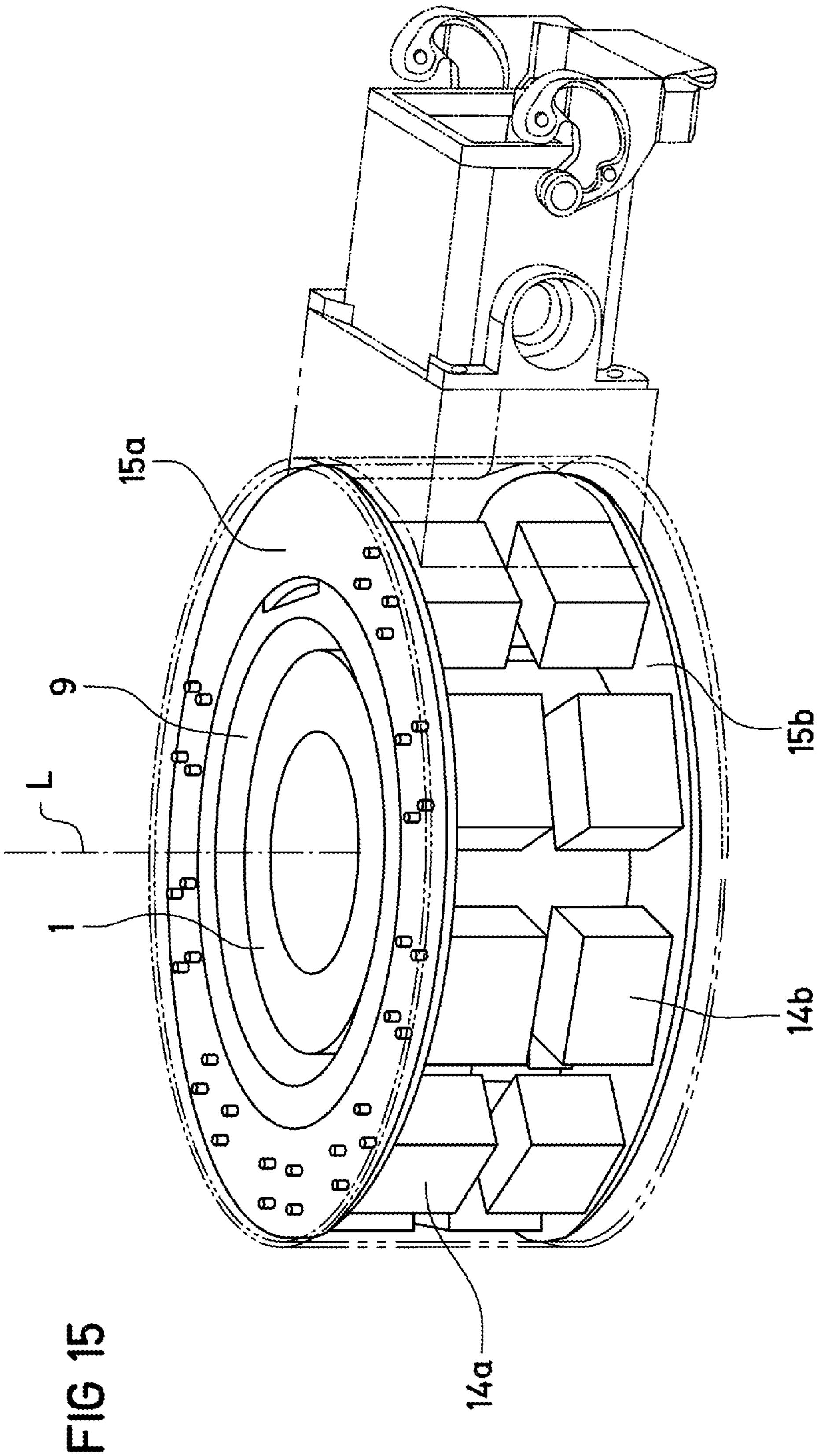
FIG. 15 is a perspective view of a second exemplary embodiment, which however differs from the first exemplary embodiment only by the nature of the fastening to the machine tool or to the stand, and which is thus identical to the first embodiment with regard to the arrangement of the capacitors and of the circuit boards or printed circuit boards that are shown therein.

The second shell 9 is particularly preferably provided with cutouts 11, each one of which receives a power semiconductor component, cf. FIG. 14. It can be clearly seen that the cutouts 11 are ideally configured to completely surround, at four sides, the power semiconductor component 10 that they receive. The power semiconductor component 10 is thus seated in a depression, so to speak, and is this particularly well shielded.

As can likewise be clearly seen, each of the power semiconductor components 10 has three connectors 12 for the supply of voltage. Here, the connectors 12 of each power semiconductor component 10 project into a region, which forms a set-back portion 13, of the second shell 9, cf. FIG. 14. This optional set-back portion 13 can make the wired connection of the connectors 12 of the respective power semiconductor component 10 easier.

In the exemplary embodiment discussed, the novel arrangement of the power semiconductor components 10 is however not the end of the matter. Instead, a particularly preferred solution is implemented here in which the capacitors 14*a*, 14*b* are grouped around the outer periphery of the induction coil. The capacitors 14*a* are preferably smoothing capacitors, which are a direct constituent part of the power circuit, and the capacitors 14*b* are preferably resonant circuit capacitors, which are likewise a direct constituent part of the power circuit. The capacitors 14*a*, 14*b*, if they were theoretically to be rotated about the center of the coil, form a cylindrical ring.

This cylindrical ring surrounds the induction coil and preferably also the power semiconductor components that are grouped around the periphery of the induction coil.

For the electrical connection of the capacitors 14*a*, 14*b*, multiple electric circuit boards 15*a*, 15*b* are provided here, which each engage around the outer periphery of the induction coil. Each of these circuit boards 15*a*, 15*b* preferably forms an annular disk. Each of the circuit boards preferably is formed of FR4 or similar materials that are customary for circuit boards. As can be seen, the axis of rotational symmetry of each of the two circuit boards, which are configured here as circuit board annular disks, is in this case coaxial with respect to the longitudinal axis of the coil. Optionally, each of the circuit boards is fastened to the trough inner side of the magnetic covers 3*a*, 3*b*, where the magnetic covers 3*a*, 3*b* project in a radial direction beyond the second shell.

The upper of the two electrical circuit boards 15*a* bears the capacitors, for example the smoothing capacitors 14*a* or the resonant circuit capacitors 14*b*, the connection lugs of which extend through the circuit board or are connected using SMD technology to the circuit board, such that the smoothing capacitors are suspended from the circuit board. The lower of the two circuit boards is of corresponding construction, and the capacitors, for example the resonant circuit capacitors 14*b* or the smoothing capacitors 14*a*, project upward therefrom. Altogether, as viewed in a direction along the longitudinal axis of the induction coil, the two electrical circuit boards 15*a*, 15*b* between them receive all of the capacitors 14*a*, 14*b* of the power circuit that feeds the induction coil.

It can thus be the that the power semiconductors form a first imaginary cylinder, which encircles the induction coil, and the capacitors 14*a*, 14*b* form a second imaginary cylinder, which encircles the first imaginary cylinder.

The capacitors, which exhibit only little sensitivity to the stray field, preferably form the imaginary outer cylinder, whilst the power semiconductor components, which require an installation space that has the least possible stray field, form the imaginary inner cylinder.

The special construction of the control circuit board or other circuit boards

It may be necessary for the circuit board on which the controller is seated, and/or the circuit boards that are in contact with the capacitors that are situated directly in the power circuit, to be shielded.

For this purpose, use is preferably made of multi-layer circuit boards, or so-called multilayer technology. Here, two or more circuit boards are laid one on top of the other. The conductor tracks run predominantly or substantially in the interior of the circuit board assembly thus formed. At least an external main surface of the circuit board assembly is metal-plated substantially over the full area, and therefore serves as shielding.

The Special Supply to the Induction Coil

It should firstly be stated as a general observation that the coil shown in FIG. 10 is preferably not "fully wound" over its entire length. Instead, it preferably is formed of two winding assemblies, which are generally substantially cylindrical. These form in each case one end side of the induction coil. Preferably, one of the two coils (in this case the lower coil) is movable in a direction parallel to the longitudinal axis L and is thus adjustable during ongoing operation such that only ever that region of the relevant sleeve section which requires heating is heated.

This prevents unnecessary heating and the generation of an unduly strong field, which self-evidently has a corresponding effect on the stray field that is encountered. Such a coil furthermore contributes to a reduction in reactive power because it does not have the windings in the middle region, which are not imperatively required from the aspect of achieving the most effective possible heating of the sleeve section of the tool holder but which, if present, have a tendency to produce additional reactive power without making a substantially important contribution to the heating action.

To provide a supply to the induction coil such that it imparts the desired action and heats the sleeve section of a tool holder sufficiently quickly, it is generally not sufficient to simply connect the induction coil directly to the 50 Hz mains alternating voltage.

Instead, the frequency of the voltage that is fed to the coil must be increased. This is generally performed electronically using a frequency converter. If one however simply feeds the coil using a frequency converter without implementing further special measures, as has hitherto commonly been the case in practice, then high reactive power losses arise.

These reactive power losses are of no further relevance from the aspect of energy efficiency, because the operating times of a shrink fit device are short—after just a few seconds of operating time, the induction coil has heated the sleeve section of a tool holder to such a degree that the tool shank can be fitted or removed; for this reason, the reactive power losses have hitherto not been regarded as problematic.

The inventors have now identified that avoiding reactive power losses is nevertheless important, because these lead to heating of, inter alia, the induction coil itself. To be able to avoid the reactive power losses, provision is made according to the invention for a supply to be provided to the induction coil via a resonant circuit.

In the resonant circuit according to the invention, the predominant part of the required energy oscillates periodically (at high frequency) between the induction coil and a capacitor unit. Thus, in every period or periodically, only the energy drawn from the resonant circuit by its heating power and its other power losses have to be replenished. The previous, very high reactive power losses are thus eliminated. This has the effect that the components of the set of power electronics can for the first time be miniaturized to such an extent that they can be integrated into the coil housing, normally whilst additionally solving the particular shielding problem that this installation involves.

A portable induction shrink fit device, which due to its overall weight of less than 10 kg can be carried by a user to a machine tool in order to be used there in situ, is thus brought within reach.

Figure 16:
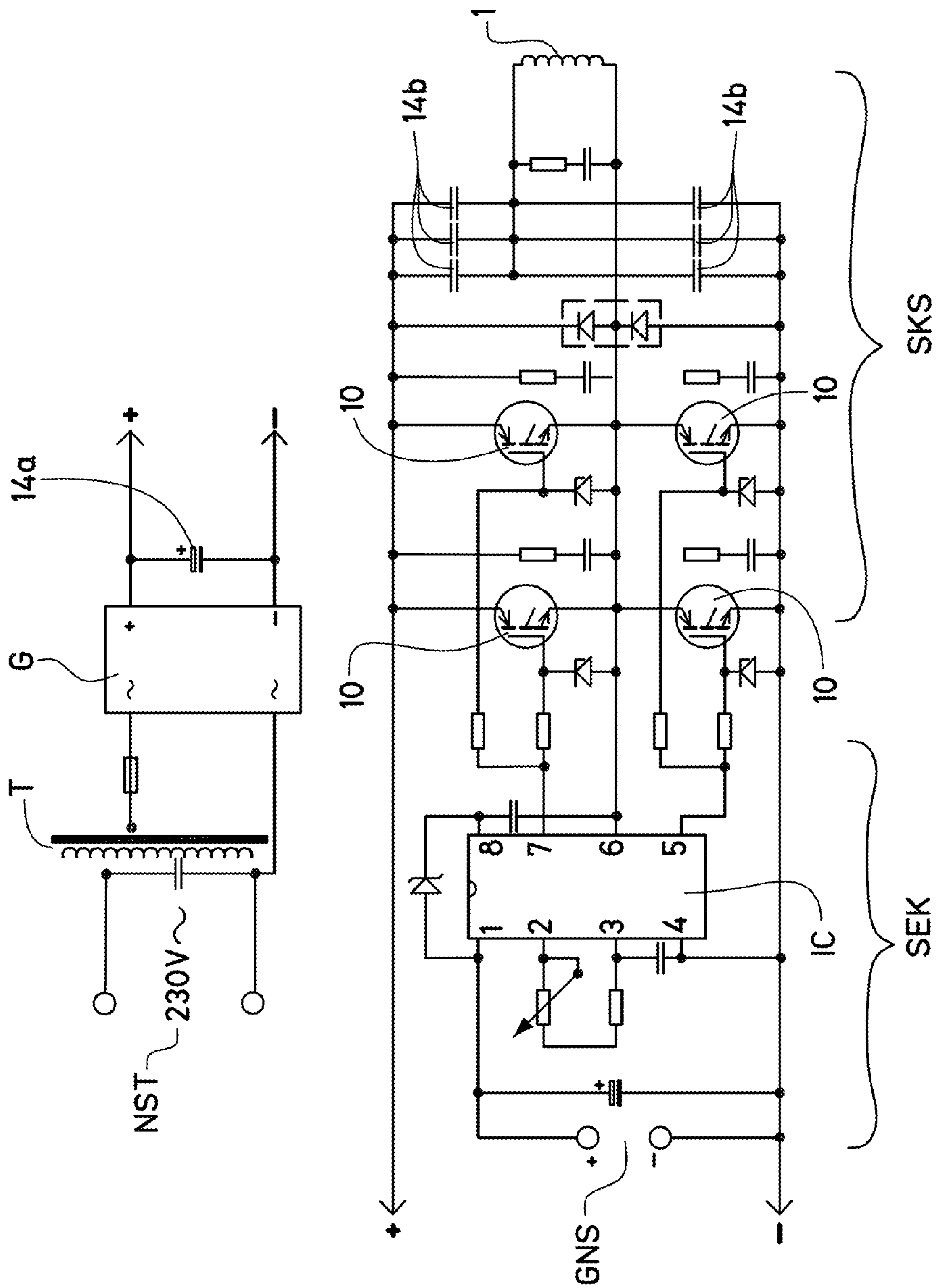
FIG. 16 is a circuit diagram of a circuit for providing a feed to the induction coil, such as may be used according to the invention for the exemplary embodiments.

The set of power electronics that feeds the induction coil is preferably configured as shown in FIG. 16, and is then distinguished by the following features: At the input side, the set of power electronics is fed preferably with the generally available mains voltage NST, which in Europe is 230 V/50 Hz/16A maximum, with corresponding values in other countries, such as 110 V in the USA. This is made possible for the first time by avoiding the previous reactive power levels, whilst a 380 V three-phase connection was previously necessary.

This does not rule out that a three-phase connection will nevertheless be necessary under particular conditions, for example in the event of a high power demand. Three-phase current may self-evidently also be used in the case of a low power demand.

The mains current is then preferably transformed to a higher voltage (transformer T) in order to reduce the currents that flow for a specified power. The current drawn from the grid is converted by the rectifier G into direct current, which in turn is smoothed by the one or more smoothing capacitors 14*a*.

The resonant circuit SKS itself is fed with this direct current. The power semiconductor components 10, the resonant circuit capacitors 14*b*, and the induction coil 1 that is used for the shrink-fitting and removal, form the backbone of the resonant circuit.

Open-loop and/or closed-loop control of the resonant circuit is performed by the set of control electronics SEK, which is configured substantially as an IC and which is fed, via a dedicated input GNS, with low direct-current voltage, which is optionally picked off downstream of the rectifier G and the one or more smoothing capacitors 14*a* by way of a corresponding voltage divider resistor.

The power semiconductor components 10 are preferably implemented by transistors of "Insulated-Gate Bipolar Transistor" type, or IGBT for short.

The set of control electronics SEK preferably switches the IGBT with a frequency that specifies the working frequency prevailing in the resonant circuit SKS.

It is important that the resonant circuit SKS never operates exactly with resonance, which exists in the presence of a phase offset between voltage U and current I of $\cos \phi=1$. This would lead here to rapid destruction of the power semiconductor components 10 by the voltage peaks. Instead, the set of control electronics SEK is configured to operate the set of power electronics or the resonant circuit SKS thereof in an operating range that merely lies close to resonance or the natural frequency of the system.

The resonant circuit is preferably controlled in open-loop or closed-loop fashion such that the following applies: $0.9 \leq \cos\phi \leq 0.99$. Values in the range $0.95 \leq \cos\phi \leq 0.98$ are particularly expedient. This leads once again to an avoidance of voltage peaks, and therefore further promotes miniaturization.

As an aside, it is also to be noted that the minimized energy consumption allows battery-powered operation for the first time. In the simplest case, a motor vehicle starter battery may be used as a suitable high-current battery.

The Special Temperature Measurement

It is desirable for shrink fit devices of the type in question to be optimized in terms of operational safety. This includes at least automatic control of the heating time and/or heating power.

The so-called inductance u=di/dt is a characteristic variable of coils through which alternating current flows. In the case of shrink fit devices of the type in question, the sleeve section of the tool holder that has been inserted into the space peripherally enclosed by the induction coil forms a major part of the magnetic circuit. Specifically, the sleeve section forms the metal core of the coil. The level of the inductance that is to be measured is therefore significantly dependent on the extent to which the sleeve section fills the center or the so-called core of the induction coil, that is to say whether the sleeve section in question has a relatively small or relatively large diameter or a greater or lesser mass and thus forms a smaller or larger iron core of the coil.

The inventor has now identified for the first time that the measurable inductance of an induction coil used for shrink-fitting is dependent not only on the geometry of the sleeve section but also to a practically utilizable extent on the temperature of the sleeve section of the tool holder. The hotter the sleeve section, the greater the inductance of the system composed of sleeve section and induction coil.

This is utilized according to the invention to improve the safety of the shrink fit apparatus. The method implementation or use, and the correspondingly configured shrink fit apparatus, utilize the following concepts:

The number of different tool holders that can be used on the shrink fit apparatus is finite. For this reason, it is not difficult for all or at least the most important of the tool holders that are used on the shrink fit apparatus to be measured and parameterized by the manufacturer.

Furthermore, it can be made easy for the user to measure and additionally store sleeve sections of tool holders that have not already been stored at the factory. The device according to the invention optionally has corresponding devices or input facilities. Ideally, on the basis of the previous parameters and database, the device identifies the respective contours by way of a measurement and then infers the inductance of the shrink chuck that is being used.

This measurement is performed by virtue of the sleeve sections of the corresponding tool holders being inserted into the interior of the induction coil, and the present inductances of the system composed of the induction coil and the sleeve section that has been inserted therein then being measured in each case when the sleeve section has reached its maximum temperature. In general, the temperature at which shrink-fitting and/or removal is optimally possible is taken as a maximum temperature. This prevents the sleeve section from being unnecessarily intensely heated and then having to cool down again over an unnecessarily long period of time. Purely for patent protection reasons, or alternatively, it is stated that the maximum temperature may also be somewhat higher than this. The maximum temperature that forms the limit value is then the maximum admissible temperature before destruction occurs, as a so-called safeguard against overheating.

The maximum values thus measured are stored for each tool holder, generally in the shrink fit apparatus or in the controller thereof. They are available there for comparison at any time.

For the purposes of shrink-fitting a particular tool holder, the sleeve section is inserted into the induction coil and, in this context, it is queried what tool holder is presently to be shrink-fitted or removed. After the user has input this information, or this information has been automatically identified, the inductance of the sleeve section/induction coil system when the sleeve section is at the desired temperature is read out for this tool holder. The inductive heating operation is then started. Here, the present inductance is measured in each case. As soon as the presently measured inductance approaches or overshoots the limit value (that is to say the stored inductance), the supply of current to the induction coil is influenced—generally deactivated or at least reduced to such an extent that no damage can occur.

It is preferably ensured that the inductive heating of a tool holder or of its sleeve section can be started only when it has been verified that a tool holder with a cold sleeve section has actually been inserted into the induction coil.

To achieve this, a further measurement is performed by the manufacturer.

This measurement is performed by virtue of the sleeve sections of the corresponding tool holders being inserted into the interior of the induction coil, and the inductance of the system composed of the induction coil and the sleeve section that has been inserted therein then being measured in each case when the sleeve section is cold, that is to say for example at a temperature below 35°. The cold values thus measured are stored for each tool holder, generally in the shrink fit apparatus or in the controller thereof. They are available there for a comparison that is to be performed at the start of a shrink-fitting process.

As soon as the user has input, or it has been automatically identified, what tool holder with what sleeve section has been inserted into the induction coil, the induction coil is at least briefly electrically energized, and the present inductance is measured in the process. If it is found here that the present inductance lies above the stored cold value, then this is a sign that an already hot sleeve section of a tool holder is situated in the interior of the induction coil. An error message is then output, and/or the heating process is preferably not started or is terminated.

Figure 17:
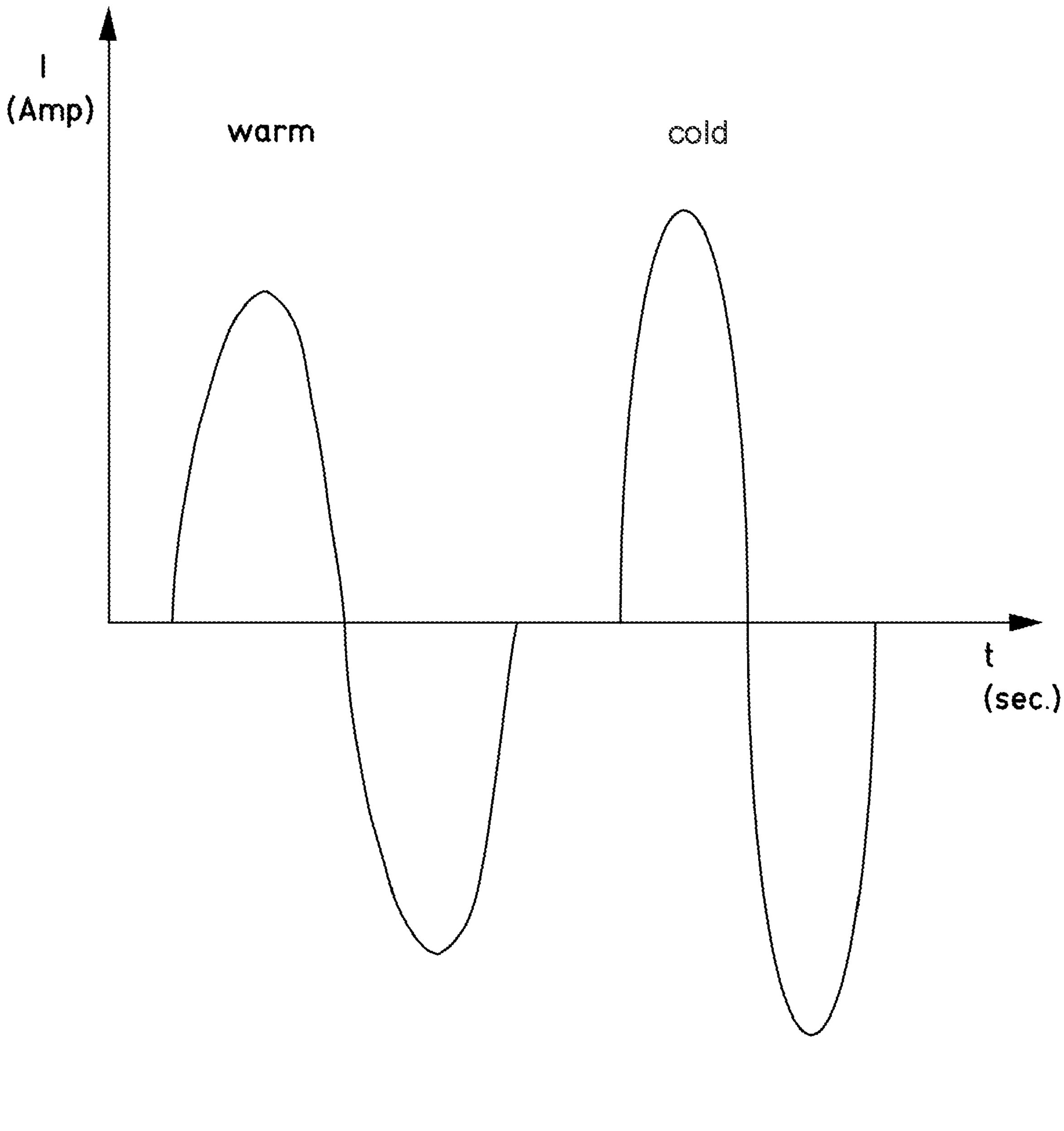
FIG. 17 is a diagram showing the varying edge steepness, which is a measure of the inductance.

Preferably, for the purposes of determining the inductance, the edge steepness of the time/current curve is measured or evaluated and used for determining the inductance. In this respect, reference is made to FIG. 17. The left-hand half of FIG. 17 shows the time/current curve exhibited by the system composed of induction coil and sleeve section when fed by a frequency inverter in the presence of a cold sleeve section. The right-hand half of FIG. 17 shows the time/current curve exhibited by the system when fed in the same way but in the presence of a sleeve section that has been heated to shrink-fitting temperature.

A particularly expedient option in conjunction with the temperature monitoring according to the invention is automatic identification of the geometry of the sleeve section that has presently been inserted into the induction coil.

For this, use is made not only of the inductance but also of the level of current consumption by the induction coil over a particular unit of time. The crucial measure is thus not the edge steepness of the individual waves but the time/current curve as a whole over a particular time interval.

In order to ascertain this, a current (test pulse) of known current magnitude, current form, frequency and effective period is applied to the coil by a precisely operating power source. The current magnitude is to be understood here to mean the magnitude of the maximum amplitude of the current. The current form is to be understood here to mean the nature of the alternating voltage, for example a squarewave alternating voltage. The effective period is to be understood here to mean the period of time for which the test pulse is applied.

A different profile of the current consumption within the relevant unit of time, that is to say a different time/current curve, arises for the relevant sleeve section depending on the diameter or the mass thereof. This means that each sleeve section has a magnetic fingerprint, so to speak.

On this basis, it is again possible here, too, for the current consumption within a particular unit of time, that is to say the time/current curve, to be measured and stored in the shrink fit apparatus by the manufacturer for all sleeve sections that may be used for processing on the shrink fit device. If the customer has then inserted a particular sleeve section of a particular tool holder into the induction coil, a corresponding test pulse is applied to the coil before the start of the actual inductive heating operation. The overall time/current curve thus obtained is compared with the stored values in order to thus determine what sleeve section has been inserted into the induction coil.

This eliminates the need for the user to specify, at the start of the inductive heating operation, what type of tool holder with what sleeve section they presently wish to process using the shrink fit device. Rather, this is identified automatically. Accordingly, the shrink fit device according to the invention can automatically retrieve that stored inductance value that is a measure of whether the inductive heating operation must be ended. At the same time, there is the possibility for the shrink fit device according to the invention to also automatically retrieve that cold value of the present inductance which is associated with the relevant sleeve section, and to identify, before the start of the inductive heating operation, whether the sleeve section that has been inserted into the induction coil is also actually cold.

Figure 18:
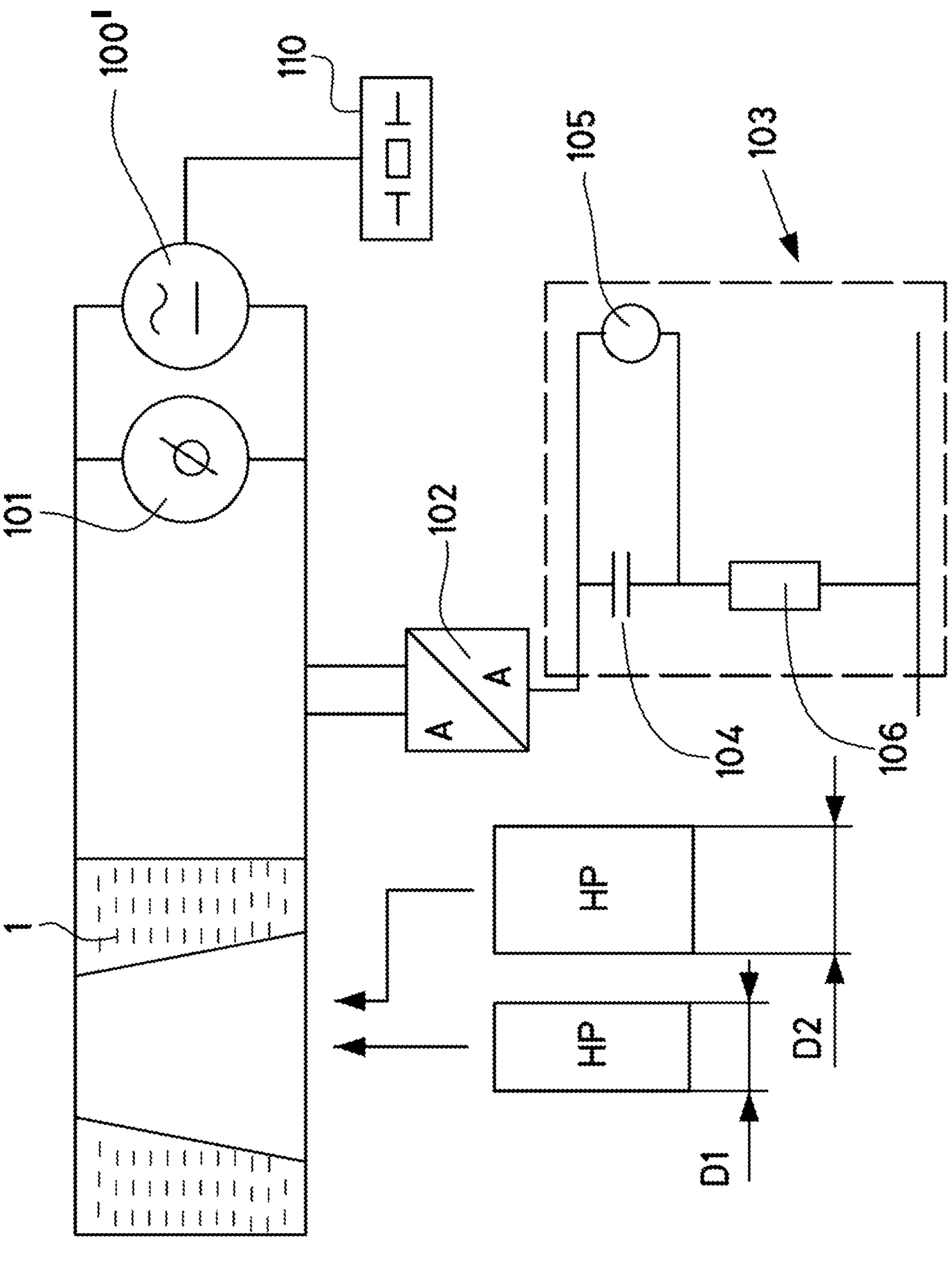
FIG. 18 is a circuit arrangement such as may be used according to the invention to measure the inductance and optionally also to automatically determine the geometry of the sleeve section.

FIG. 18 shows how the measurements described in this chapter can be implemented in terms of apparatus.

The induction coil 1 can be clearly seen here. The induction coil 1 is fed by a power source 100 that generates a precisely defined test pulse, as discussed above. To produce such a test pulse with the required precision, a closed-loop control unit 110 may be provided.

Between the two connection lines of the induction coil 1, there is a measuring device 101 which measures the present inductance and which may be a measuring device of a type known per se. The measuring device 101 preferably includes a comparator that compares the presently measured inductance with a limit value of the inductance, which is a measure of the sleeve section having been heated sufficiently to allow shrink-fitting or removal. The comparator is preferably also capable of comparing whether the presently measured cold value of the present inductance corresponds to the cold value of the inductance that the sleeve section that has presently been introduced into the induction coil should have.

An auxiliary circuit 103 is connected via a transducer 102. The auxiliary circuit serves to determine the geometry of the sleeve section that has presently been inserted into the induction coil. For this purpose, the auxiliary circuit has at least one measuring capacitor 104 and at least one measuring device 105. The measuring device 105 is capable of measuring the present voltage prevailing across the capacitor. Furthermore, the auxiliary circuit generally includes a discharge resistor 106, which is typically connected to ground and which ensures that the measuring capacitor is discharged again after a test cycle, whilst the resistance is selected to be high enough that it does not adversely affect the relatively short test cycle itself.

The time/current curve exhibited by the induction coil to which the test pulse is applied changes depending on the construction of the sleeve section HP that has been inserted into the interior of the induction coil 1 (see also the two variants in FIG. 18). This has the effect that the time/current curve that is measured at the capacitor 104 by the measuring device 105 also changes accordingly. This time/current curve is in each case a fingerprint relating to the nature of the sleeve section.

Mobile Unit

A special aspect of the invention is that, for the first time, a mobile shrink fit unit is made possible which, in an operational state, generally weighs less than 10 kg, which can therefore, and normally also due to its construction as only a coil housing with a plug connector, be easily carried or maneuvered. It is therefore moved to the machine tool in order to be used in situ at the machine tool. It is thus possible to depart from the previous concept of the static shrink fit machine, to which the tool holders must be delivered and from which the tool holders must be transported away again in order to carry out and continue a tool change.

Firstly, it is generally the case that at least the following components are accommodated in a common housing: the induction coil, the first shell, the second shell if present, the power semiconductor elements, and preferably also the capacitors. Ideally, in addition to the induction coil, all components required for operating the induction coil, including the set of control electronics, are accommodated in the common housing.

Preferably, the only thing exiting the housing is a feed cable, which serves for the supply of voltage to the shrink fit device thus formed and which, for this purpose, ideally bears at its end a plug connector that allows a connection to the voltage supply without the use of tools. Here, mains voltage is preferably used as a voltage supply, as mentioned above. The end of the feed cable is then preferably equipped with a Schuko plug that corresponds to the relevant national requirements.

If the shrink fit apparatus is to be held by hand, centering devices are advantageously attached to the coil housing, which centering devices make it easier for the coil to be positioned centrally relative to the tool axis. The centering devices may for example be configured as radially movable fingers Fi, as indicated in FIGS. 10 and 11.

It has proven to be particularly expedient if the apparatus is equipped with at least one coupling KU that enables it to be coupled to the machine tool.

The apparatus can thus be easily fastened to the machine tool, and then assumes a safe working position in which it is protected against contamination by coolant and chip particles.

This coupling KU preferably corresponds to the common coupling profiles such as are used for the tool holders that are to be processed using the shrink fit apparatus according to the invention, for example an HSK profile, as shown in FIG. 11. In order to bring the shrink fit apparatus according to the invention into a safe working position, it is then merely necessary for the tool holder that is to undergo a tool change to be decoupled from the spindle of the machine tool, and for the shrink fit apparatus with its identical coupling profile to be coupled in place of the tool holder to the spindle of the machine tool. It is particularly expedient if the coupling of the shrink fit apparatus can be operationally dismounted from the shrink fit apparatus, preferably by hand without the use of tools (in particular using a bayonet fastener). In this way, the coupling of the shrink fit apparatus can be easily adapted to the coupling type used on the relevant machine tool (steep taper coupling, HSK etc.).

Ideally, the respective couplings are connected to the shrink fit apparatus according to the invention such that cooling liquid/cooling lubricant discharged from the cooling system of the machine tool can flow through the at least one cooling channel that the shrink fit apparatus has, preferably in its second shell, as discussed above.

Here, a cooling device may be provided, preferably a cooling device which is integrated into the shrink fit apparatus (normally adjacent to the induction coil). After the end of the shrink-fitting operation, the sleeve section of the tool holder is inserted into the cooling device in order to be actively cooled to a temperature at which it is safe to touch.

The cooling device is expediently likewise fed by the cooling system of the machine tool, generally likewise via the coupling. For this reason, protection is also claimed for the use of the cooling liquid that is discharged by a machine tool for cooling purposes within a shrink fit device (cooling of the second shell and/or of the tool holder).

Alternatively, the shrink fit apparatus may also be stored in the tool magazine of the machine tool. The tool changer can then either automatically insert the shrink fit apparatus into the machine spindle or move the shrink fit apparatus to a tool receptacle that has been clamped in the spindle, for the purposes of removing or shrink-fitting a tool. In the latter case, energy may be supplied via a cable that is connected by a plug connector directly to the shrink fit apparatus. In both cases, the shrink fit apparatus does not need to be held by hand.

General Observations

Protection is also claimed for shrink fit apparatuses or methods or uses which each only have the features of one or more of the following paragraphs, independently of features claimed by the presently established set of claims. Protection is furthermore also claimed for shrink fit apparatuses or methods or uses which have features of one or more of the paragraphs listed below and additionally other features from the already-established claims or from the rest of the description including the figures.

A shrink fit apparatus, distinguished by the fact that the circuit board is a circuit board annular disk, the axis of rotational symmetry of which runs preferably coaxially but otherwise parallel to the longitudinal axis of the induction coil.

A shrink fit apparatus, distinguished by the fact that two circuit board annular disks are provided, between which along the periphery of the induction coil the smoothing capacitors are disposed.

A shrink fit apparatus, distinguished by the fact that the second shell forms one or more cooling channels which preferably run in the interior of the second shell.

A shrink fit apparatus, distinguished by the fact that the apparatus has a coupling for fastening the apparatus in the receptacle of a machine tool spindle.

A shrink fit apparatus, distinguished by the fact that the shrink fit apparatus is configured such that it can be fed with coolant by the cooling system of the machine tool.

A shrink fit apparatus, distinguished by the fact that the induction coil with its first and second shells, and at least the power semiconductor components and/or the smoothing capacitors and ideally also the set of electronics for actuating the power semiconductor components, are accommodated in the interior of a coil housing or coil housing ring which encloses at least the periphery of the induction coil and preferably also engages over at least one, preferably both end sides of the induction coil.

A shrink fit apparatus, distinguished by the fact that the coil housing has a plug connector for the direct infeed of mains alternating voltage from the public grid (110 V, 230 V or 380 V).

A shrink fit apparatus, distinguished by the fact that the shrink fit apparatus is battery-operated.

A shrink fit apparatus, distinguished by the fact that a shielding collar is provided which is formed of individual segments which are movable such that they can be moved both with a movement component in a radial direction and with a movement component in an axial direction.

A shrink fit apparatus, distinguished by the fact that centering elements are provided on that end side of the induction coil which faces toward the tool holder and/or in the air interior space of the induction coil, which centering elements, at any rate when the sleeve section has been pushed into the induction coil as far as a stop, force the sleeve section to be positioned coaxially in the induction coil.

A shrink fit apparatus, distinguished by the fact that the shrink fit apparatus has at least two coil winding portions which, during operation, can be moved toward one another or away from one another in a direction parallel to the longitudinal axis for the purposes of adjustment to the geometry of a sleeve section that is to be heated.

A shrink fit system, being formed of a shrink fit apparatus according to any one of the preceding paragraphs, is distinguished by the fact that the shrink fit system additionally includes different couplings which are fastenable to the shrink fit apparatus and by which the shrink fit apparatus can be fixed to the spindle of a machine tool.

Although the invention has been illustrated and described in more detail on the basis of the preferred exemplary embodiments, the invention is not restricted by the disclosed examples, and other variations may be derived from these without departing from the scope of protection of the invention.

The following is a summary list of reference numerals and the corresponding structure used in the above description of the invention.

LIST OF REFERENCE DESIGNATIONS

- 2 Device for heat treatment, shrink fit device, cooling device, shrink fit device with cooling device
- 3*aa* Pole annular disk
- 3*bb* Shielding collar
- 4 Shrink chuck
- 6 Shank/rotary tool, milling cutter/milling tool
- 8 Receiving device, receiving opening
- 10 Central axis, coil axis
- 12 Heat treatment unit, induction coil arrangement, cooling device/unit
- 14 Measuring/computing unit
- 14*a* Capacitor
- 14*b* Capacitor
- 15*a* Circuit board
- 15*b* Circuit board
- 16, 16' Temperature sensor, pyrometer with radiation detector, radiation detector
- 18 (Coil) housing
- 20 Recesses
- 22 Measuring channel
- 24 Coil winding
- 26 Aperture

28 Control unit
30 Ratio pyrometer
32 Sleeve section
34 Clamping region
36 End opening
38 Front end
40 Tool shank, milling cutter shank
42 Front working portion
44 Axial central region
46 Coil-side inner portion
48 Outer wall
50 Induction coil housing
52 Cable
54 Focusing apparatus, shielding devices, diaphragm
56 (Annular) structural unit, measuring/sensor ring
58 Central axis of the (annular) structural unit/measuring ring
60 Sensor
62 (Infrared) reflection sensor
64 Display device, (LED) (thermal) status display
70 Column
72 Cooling head
74 Cooling attachment
76 (Measuring ring) housing
78 Transmitter
80 Receiver
82 (Red) light-emitting diode
84 Supply line
86 Microcontroller
88 (Left) arm
90 (Right) arm
92 Passage, recess
94 (Green) light-emitting diode
100 Method
100' Power source
101 Measuring device
102 Transducer
103 Auxiliary circuit
104 Measuring capacitor
105 Measuring device
106 Discharge resistor
110 Control unit
120 Heat treatment, heating, shrink-fitting/removal, cooling
140 Ascertaining a resulting shell/surface temperature
160 Controlling the heat treatment, controlling the heating/cooling, controlling the heating power or the supply of current
200 Interaction of several sensors (16, 62)
220 Identifying, using the reflection sensor, a shrink chuck (4) that is received in the receiving device (8)
D1 Diameter
D2 Diameter
GNS Dedicated input
HP Sleeve section
KU Coupling
L Longitudinal axis
NST mains voltage
SEK Control electronics
SKS Resonant circuit
W Tool

The invention claimed is:

1. A device or a shrink fit device or a cooling device or a shrink fit device with a cooling device for heat-treating or for inductively heating or cooling shrink chucks for shank tools, the device comprising:

a receiving device or receiving opening for receiving a shrink chuck;

a heat treatment unit or an induction coil arrangement or a cooling unit enclosing said receiving device;

a measuring/computing unit for temperature measurement of the shrink chuck, said measuring/computing unit having at least one temperature sensor, for detecting a shell temperature of the shrink chuck disposed in said receiving device, and a reflection sensor or an infrared reflection sensor, said at least one temperature sensor and said reflection sensor or infrared reflection sensor being disposed around said receiving device;

said measuring/computing unit being configured for applying a current test pulse of known current magnitude, current form, frequency and effective period to said heat treatment unit or induction coil arrangement before starting an actual heat treatment operation, cooling operation or inductive heating operation, on the shrink chuck inserted into said heat treatment unit or induction coil arrangement;

for the test pulse, a time/current curve for the shrink chuck inserted into the heat treatment unit or induction coil arrangement being ascertained, and an overall time/current curve ascertained for the test pulse being taken as a magnetic fingerprint for the shrink chuck inserted into the heat treatment unit or induction coil arrangement;

an item of geometrical information for the shrink chuck inserted into the heat treatment unit or induction coil arrangement being ascertained by using the magnetic fingerprint;

said reflection sensor performing a reflection measurement on the shrink chuck inserted into the heat treatment unit or induction coil arrangement, and said reflection sensor using the item of geometrical information to perform a reflection measurement on the shrink chuck inserted into said heat treatment unit or induction coil arrangement and correcting the reflection measurement; and said at least one temperature sensor performing a temperature measurement on the shrink chuck inserted into said heat treatment unit or induction coil arrangement and correcting the temperature measurement, by using the reflection measurement and the item of geometrical information or by using the corrected reflection measurement.

2. The device according to claim 1, wherein:

said heat treatment unit or induction coil arrangement or cooling unit encloses said receiving device concentrically relative to a central axis;

said measuring/computing unit performs the temperature measurement of the shrink chuck contactlessly;

said at least one temperature sensor detects the shell temperature of the shrink chuck contactlessly; and said item of geometrical information for the shrink chuck is an outer diameter.

3. The device according to claim 1, wherein:

said at least one temperature sensor of said measuring/computing unit includes a plurality of temperature sensors disposed around said receiving device, for detecting the shell temperature of the shrink chuck disposed in said receiving device, or said at least one temperature sensor of said measuring/computing unit is disposed around said receiving device and inclined relative to a central axis, for contactlessly detecting the shell temperature of the shrink chuck disposed in said receiving device.

4. The device according to claim 1, wherein said at least one temperature sensor includes a plurality of temperature sensors, and at least two or all of said temperature sensors have different configurations/measurement settings.

5. The device according to claim 3, wherein said at least one temperature sensor or said plurality of temperature sensors or said at least one inclined temperature sensor is configured as a radiation detector or a pyrometer with a radiation detector, for detecting thermal radiation from the shrink chuck disposed in said receiving device.

6. The device according to claim 3, wherein said at least one inclined temperature sensor has an angle of inclination of between 30° and 60°.

7. The device according to claim 3, wherein said at least one inclined temperature sensor has an angle of inclination of 45°.

8. The device according to claim 1, wherein said sensors are disposed at least one of in a circle, or at different axial heights relative to a central axis, or around said receiving device.

9. The device according to claim 1, wherein said heat treatment unit or induction coil arrangement has a housing, and at least one of said heat treatment unit or induction coil arrangement or said housing has at least one recess formed therein for receiving at least one of said sensors.

10. The device according to claim 9, wherein said at least one recess is configured as at least one measuring channel running substantially radially relative to a central axis through at least one of said heat treatment unit or induction coil arrangement or said housing.

11. The device according to claim 10, wherein said heat treatment unit or induction coil arrangement is at least one of:

configured as an induction coil arrangement having a coil winding wound so as to leave said at least one measuring channel free, or configured as partial induction coil arrangements, between which said at least one measuring channel is formed.

12. The device according to claim 10, wherein:

at least one of said sensors is disposed at least partially in or at said at least one measuring channel, and said at least one sensor performs measurements through said at least one measuring channel, or several or all of said sensors are disposed at least partially in or at said at least one measuring channel, and said sensors perform measurements through said at least one measuring channel.

13. The device according to claim 1, which further comprises:

a substantially annular structural unit having a central axis;

said sensors being disposed at least one of:

in said substantially annular structural unit, or substantially in a circle around said central axis of said substantially annular structural unit, or at different axial heights or at the same axial height relative to said central axis of said substantially annular structural unit.

14. The device according to claim 13, wherein said substantially annular structural unit is disposed coaxially relative to a central axis of the device or axially adjacent to said heat treatment unit or induction coil arrangement or cooling unit.

15. The device according to claim 13, wherein said sensors include sensors of the same type disposed adjacent one another in said substantially annular structural unit.

16. The device according to claim 1, wherein said measuring/computing unit is configured for ascertaining a resulting shell temperature of a shrink chuck disposed in said receiving device by using the corrected temperature measurement from said at least one temperature sensor.

17. The device according to claim 16, wherein said heat treatment unit or induction coil arrangement or cooling unit includes a controller configured for controlling a power of said heat treatment unit or a supply of current to said heat treatment unit configured as an induction coil arrangement, based on a resulting shell temperature.

18. The device according to claim 1, which further comprises a display device for displaying a thermal state of a tool receptacle of the shrink chuck disposed in said receiving device.

19. A method for operating a device according to claim 1 for inductively heating a shrink chuck or cooling a shrink chuck, the method comprising:

applying a current test pulse of known current magnitude, current form, frequency and effective period to the heat treatment unit or induction coil arrangement before a start of an actual heat treatment operation or cooling operation or inductive heating operation, on the shrink chuck having been inserted into the heat treatment unit or induction coil arrangement;

for the test pulse, ascertaining a time/current curve for the shrink chuck inserted into the heat treatment unit or induction coil arrangement, and taking an overall time/current curve ascertained for the test pulse as a magnetic fingerprint for the shrink chuck inserted into the heat treatment unit or induction coil arrangement;

ascertaining an item of geometrical information or an outer diameter for the shrink chuck inserted into the heat treatment unit or induction coil arrangement by using the magnetic fingerprint;

performing a reflection measurement on the shrink chuck inserted into the heat treatment unit or induction coil arrangement by using the reflection sensor, and using the reflection sensor and the item of geometrical information to perform a reflection measurement on the shrink chuck inserted into the heat treatment unit or induction coil arrangement, and correcting the reflection measurement; and using the corrected reflection measurement to correct a temperature measurement performed by the temperature sensor on the shrink chuck inserted into the heat treatment unit or induction coil arrangement.

20. The method according to claim 19, which further comprises ascertaining a resulting shell temperature of the shrink chuck disposed in the receiving device by using the corrected temperature measurement from the temperature sensor.

21. The method according to claim 19, which further comprises:

inductively heating and thus expanding the shrink chuck in the receiving device enclosed by the heat treatment unit or induction coil arrangement, and using a resulting shell temperature to control a heating operation, and automatically stopping the heating operation upon reaching a specified temperature, or cooling the shrink chuck in the receiving device enclosed by the heat treatment unit or a cooling unit, and using a resulting shell temperature to control a cooling operation.

22. The method according to claim 19, which further comprises setting different calibrations/settings or different emissivities for a plurality of temperature sensors, at least one of comparing or jointly processing measurements performed by using the plurality of temperature sensors, and determining a resulting shell temperature from the measurements.

23. The method according to claim 19, which further comprises evaluating a signal from the same radiation sensor in different ways.

* * * * *